United States Patent
Garai et al.

(10) Patent No.: US 12,490,920 B2
(45) Date of Patent: Dec. 9, 2025

(54) ADJUSTABLE GLUCOSE SENSOR INITIALIZATION SEQUENCES

(71) Applicant: Medtronic MiniMed, Inc., Northridge, CA (US)

(72) Inventors: Ellis Garai, Woodland Hills, CA (US); Sarkis D. Aroyan, Northridge, CA (US); Margaret R. Miller, Northridge, CA (US); Melissa Tsang, Sherman Oaks, CA (US)

(73) Assignee: MEDTRONIC MINIMED, INC., Northridge, CA (US)

( * ) Notice: Subject to any disclaimer, the term of this patent is extended or adjusted under 35 U.S.C. 154(b) by 232 days.

(21) Appl. No.: 17/345,511

(22) Filed: Jun. 11, 2021

(65) Prior Publication Data

US 2022/0395199 A1 Dec. 15, 2022

(51) Int. Cl.
- A61B 5/145 (2006.01)
- A61B 5/1468 (2006.01)
- A61B 5/1486 (2006.01)
- A61B 5/1495 (2006.01)

(52) U.S. Cl.
CPC ........ *A61B 5/14532* (2013.01); *A61B 5/1468* (2013.01); *A61B 2560/0247* (2013.01); *A61B 2562/12* (2013.01)

(58) Field of Classification Search
CPC .............. A61B 5/14532; A61B 5/1468; A61B 2560/0247; A61B 2560/12; A61B 2562/12; A61B 5/1486; A61B 5/1495
See application file for complete search history.

(56) References Cited

U.S. PATENT DOCUMENTS

| | | | |
|---|---|---|---|
| 10,327,686 B2 | 6/2019 | Nogueira et al. | |
| 2010/0025238 A1* | 2/2010 | Gottlieb | A61B 5/14532 |
| | | | 204/403.01 |
| 2014/0135605 A1 | 5/2014 | Gottlieb et al. | |
| 2019/0000358 A1 | 1/2019 | Patel | |
| 2019/0117135 A1 | 4/2019 | Wieder | |
| 2020/0000381 A1 | 1/2020 | Lu et al. | |
| 2020/0245912 A1* | 8/2020 | Wu | A61B 5/002 |
| 2021/0113117 A1 | 4/2021 | Srinivasan et al. | |
| 2022/0313124 A1* | 10/2022 | Garcia | A61B 5/14532 |

FOREIGN PATENT DOCUMENTS

| | | | | |
|---|---|---|---|---|
| CN | 110632370 A | * | 12/2019 | G01R 19/12 |
| WO | 2022260825 A1 | | 12/2022 | |

OTHER PUBLICATIONS

International Search Report and Written Opinion of International Application No. PCT/US2022/029154 dated Aug. 17, 2022, 13 pp.
EP Office Action dated Apr. 2, 2025 in EP Application No. 220726972.7, with English Translation.

* cited by examiner

*Primary Examiner* — Justin Xu
(74) *Attorney, Agent, or Firm* — Weaver Austin Villeneuve & Sampson LLP

(57) ABSTRACT

An example method for initializing a glucose sensor includes executing an initialization sequence for the glucose sensor, wherein the initialization sequence is based on one or more of parameters related to manufacturing the glucose sensor or environmental conditions of the glucose sensor that are present in vivo, and reporting glucose levels in a patient after the initialization sequence.

20 Claims, 17 Drawing Sheets

ADJUSTABLE GLUCOSE SENSOR INITIALIZATION SEQUENCES

TECHNICAL FIELD

This disclosure relates to initialization sequences for glucose sensors.

BACKGROUND

Glucose sensors are configured to detect and/or quantify the amount of glucose in a patient's blood, which enables patients and medical personnel to monitor physiological conditions within the patient's body. In some examples, it may be beneficial to monitor blood glucose levels on a continuing basis (e.g., in a diabetic patient). Thus, glucose sensors have been developed for use in obtaining an indication of blood glucose levels in a diabetic patient. Such indications are useful in monitoring and/or adjusting a treatment regimen, which typically includes administration of insulin to the patient.

A patient can measure their blood glucose (BG) using a BG measurement device (i.e., glucose meter), such as a test strip meter, a continuous glucose measurement system (or a continuous glucose monitor (CGM)), or a hospital hemacue. CGMs may be beneficial for patients who desire to take more frequent BG measurements. Some example CGM systems include subcutaneous (or short-term) sensors and implantable (or long-term) sensors. A CGM system may execute an initialization sequence when the CGM is inserted into a patient. The initialization sequence may speed up sensor equilibration and may allow a CGM system to provide reliable glucose measurements earlier.

SUMMARY

In general, this disclosure describes techniques for executing an initialization sequence for a glucose sensor (e.g., a CGM or other in vivo glucose sensor). More particularly, this disclosure describes techniques and devices for adjusting the initialization sequence of a glucose sensor. In some examples, the initialization sequence may be adjusted based on one or more of parameters related to manufacturing the glucose sensor or environmental conditions of the glucose sensor that are present in vivo.

Some example glucose sensors use an initialization sequence when the glucose sensor is inserted into a patient. The initialization sequence may speed up sensor equilibration and may allow a CGM system to provide reliable glucose measurements earlier. Typically, each specific glucose sensor design uses a fixed initialization sequence in a one sequence fits all approach. However, sensor initialization time may vary due to variations in manufacturing of a particular, individual glucose sensor. As such, there may be a range of initialization times for a particular glucose sensor due to manufacturing variations.

Using a one initialization sequence fits all approach does not account for manufacturing variations. As such, the fixed initialization sequence may subject the glucose sensor to potential undesired effects of the initialization sequence, such as performance variability and longevity reduction. This disclosure describes techniques and devices that optimize and/or adjust the initialization sequence of a glucose sensor based on parameters related to manufacturing a particular glucose sensor. In this way, the glucose sensor may execute a more optimal initialization sequence. Accordingly, the time between glucose sensor insertion and accurate glucose sensor readings may be shortened, thus leading to increased user satisfaction. A more optimal initialization sequence may also improve the longevity of the glucose sensor.

In addition to manufacturing variations, the length of time an initialization sequence of a glucose sensor takes to complete may be dependent on the environmental conditions upon insertion. That is, it may take multiple hours for blood glucose and other interstitial fluids to fully hydrate the chemistry stack of the sensing electrodes of the glucose sensor. Until the electrodes reach equilibrium, the readings of the glucose sensor may be inaccurate.

In general, the electrical current (iSig) flowing through the sensing (e.g., working) electrode of a glucose sensor is indicative of the blood glucose level in the patient's interstitial fluid. However, the current (iSig) behavior of the glucose sensor is not stable until the chemistry stack has reached equilibrium. As such, glucose readings during this initialization period may not be accurate. The amount of glucose present at the time of insertion (e.g., the environmental conditions of the glucose sensor) affects the rate at which the current (iSig) stabilizes given different voltages applied to the working electrode during the initialization sequence. In one example of the disclosure, the glucose sensor may adjust the voltage applied to the working electrode during the initialization sequence based on a measured change in the current (iSig), where the measured change in the current is reflective of the environmental conditions of the sensor. In this way, current (iSig) stabilization may be achieved more quickly, and therefore, a shorter initialization sequence may be used. As such, quicker and more accurate glucose readings may be achieved.

In one example, this disclosure describes a method for initializing a glucose sensor that includes executing an initialization sequence for the glucose sensor, wherein the initialization sequence is based on one or more of parameters related to manufacturing the glucose sensor or environmental conditions of the glucose sensor that are present in vivo, and reporting glucose levels in a patient after the initialization sequence.

In another example, this disclosure describes a device comprising a memory and one or more processors configured to execute an initialization sequence for a glucose sensor, wherein the initialization sequence is based on one or more of parameters related to manufacturing the glucose sensor or environmental conditions of the glucose sensor that are present in vivo, and report glucose levels in a patient after the initialization sequence.

In another example, this disclosure describes a non-transitory computer-readable storage medium having stored thereon instructions that, when executed, configure one or more processors to execute an initialization sequence for the glucose sensor, wherein the initialization sequence is based on one or more of parameters related to manufacturing the glucose sensor or environmental conditions of the glucose sensor that are present in vivo, and report glucose levels in a patient after the initialization sequence.

The details of one or more examples are set forth in the accompanying drawings and the description below. Other features, objects, and advantages will be apparent from the description and drawings, and from the claims.

DETAILED DESCRIPTION

In general, this disclosure describes techniques for executing an initialization sequence for a glucose sensor (e.g., a CGM or other in vivo glucose sensor). More particularly, this disclosure describes techniques and devices for adjusting the initialization sequence of a glucose sensor. In some examples, the initialization sequence may be adjusted based on one or more of parameters related to manufacturing the glucose sensor or environmental conditions of the glucose sensor that are present in vivo.

Figure 1:
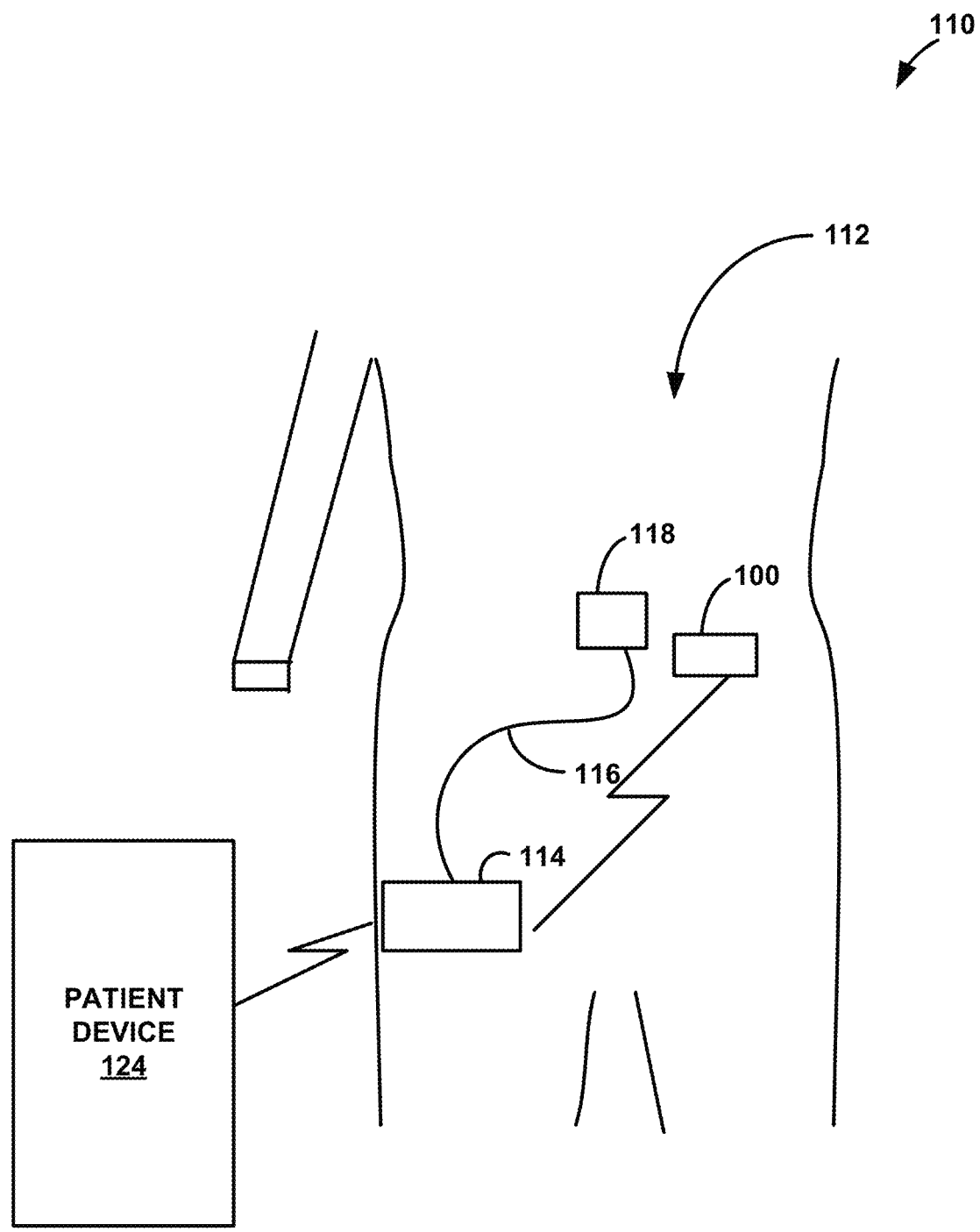
FIG. 1 is a block diagram illustrating an example glucose level management system in accordance with one or more examples described in this disclosure.

FIG. 1 is a block diagram illustrating an example glucose level management system in accordance with one or more examples described in this disclosure. FIG. 1 illustrates system 110 that includes insulin pump 114, tubing 116, infusion set 118, monitoring device 100 (e.g., a glucose level monitoring device comprising a glucose sensor), and patient device 124. Insulin pump 114 may be described as a tethered pump, because tubing 116 tethers insulin pump 114 to infusion set 18. In some examples, rather than utilizing a tethered pump system comprising insulin pump 114, tubing 116, infusion set 118, and/or monitoring device 100, patient 112 may utilize a patch pump. Instead of delivering insulin via tubing and an infusion set, a pump patch may deliver insulin via a cannula extending directly from an insulin pump. In some examples, a glucose sensor may also be integrated into such an insulin pump (e.g., a so-called "all-in-one (AIO) insulin pump").

Patient 112 may be diabetic (e.g., Type 1 diabetic or Type 2 diabetic), and therefore, the glucose level in patient 112 may be controlled with delivery of supplemental insulin. For example, patient 112 may not produce sufficient insulin to control the glucose level or the amount of insulin that patient 112 produces may not be sufficient due to insulin resistance that patient 112 may have developed.

To receive the supplemental insulin, patient 112 may carry insulin pump 114 that couples to tubing 116 for delivery of insulin into patient 112. Infusion set 118 may connect to the skin of patient 112 and include a cannula to deliver insulin into patient 112. Monitoring device 100 may also be coupled to patient 112 to measure glucose level in patient 112. Insulin pump 114, tubing 116, infusion set 118, and monitoring device 100 may together form an insulin pump system. One example of the insulin pump system is the MINIMED™ 670G insulin pump system by MEDTRONIC MINIMED, INC. However, other examples of insulin pump systems may be used and the example techniques should not be considered limited to the MINIMED™ 670G insulin pump system. For example, the techniques described in this disclosure may be utilized with any insulin pump and/or glucose monitoring system that includes an in vivo glucose sensor (e.g., a continuous glucose monitor or other in vivo glucose sensor).

Monitoring device 100 may include a sensor that is inserted under the skin of patient 112 (e.g., in vivo), such as near the stomach of patient 112 or in the arm of patient 112 (e.g., subcutaneous connection). The sensor of monitoring device 100 may be configured to measure the interstitial glucose level, which is the glucose found in the fluid between the cells of patient 112. Monitoring device 100 may be configured to continuously or periodically sample the glucose level and rate of change of the glucose level over time.

In one or more examples, insulin pump 114, monitoring device 100, and/or the various components illustrated in FIG. 1, may together form a closed-loop therapy delivery system. For example, patient 112 may set a target glucose level, usually measured in units of milligrams per deciliter, on insulin pump 114. Insulin pump 114 may receive the current glucose level from monitoring device 100 and, in response, may increase or decrease the amount of insulin delivered to patient 112. For example, if the current glucose level is higher than the target glucose level, insulin pump 114 may increase the insulin. If the current glucose level is lower than the target glucose level, insulin pump 114 may temporarily cease delivery of the insulin. Insulin pump 114 may be considered as an example of an automated insulin delivery (AID) device. Other examples of AID devices may be possible, and the techniques described in this disclosure may be applicable to other AID devices. As described in more detail below, insulin pump 114 may be configured to operate in accordance with user-specific configuration data to delivery insulin to patient 112.

Insulin pump 114 and monitoring device 100 may be configured to operate together to mimic some of the ways in which a healthy pancreas works. Insulin pump 114 may be configured to deliver basal dosages, which are small amounts of insulin released continuously throughout the day. There may be times when glucose levels increase, such as due to eating or some other activity that patient 112 undertakes. Insulin pump 114 may be configured to deliver bolus dosages on demand in association with food intake or to correct an undesirably high glucose level in the bloodstream. In one or more examples, if the glucose level rises above a target level, then insulin pump 114 may deliver a bolus dosage to address the increase in glucose level. Insulin pump 114 may be configured to compute basal and bolus dosages and deliver the basal and bolus dosages accordingly. For instance, insulin pump 114 may determine the amount of a basal dosage to deliver continuously and then determine the amount of a bolus dosage to deliver to reduce glucose level in response to an increase in glucose level due to eating or some other event.

Accordingly, in some examples, monitoring device 100 may sample glucose levels for determining rate of change in glucose level over time. Monitoring device 100 may output the glucose level to insulin pump 114 (e.g., through a wireless link connection like Bluetooth). Insulin pump 114 may compare the glucose level to a target glucose level (e.g., as set by patient 112 or a clinician) and adjust the insulin dosage based on the comparison. In some examples, insulin pump 114 may adjust insulin delivery based on a predicted glucose level (e.g., where glucose level is expected to be in the next 30 minutes).

As described above, patient 112 or a clinician may set one or more target glucose levels on insulin pump 114. There may be various ways in which patient 112 or the clinician may set a target glucose level on insulin pump 114. As one example, patient 112 or the clinician may utilize patient device 124 to communicate with insulin pump 114. Examples of patient device 124 include mobile devices, such as smartphones, tablet computers, laptop computers, and the like. In some examples, patient device 124 may be a special programmer or controller (e.g., a dedicated remote control device) for insulin pump 114. Although FIG. 1 illustrates one patient device 124, in some examples, there may be a plurality of patient devices. For instance, system 110 may include a mobile device and a dedicated wireless controller, each of which is an example of patient device 124. For ease of description only, the example techniques are described with respect to patient device 124 with the understanding that patient device 124 may be one or more patient devices.

Patient device 124 may also be configured to interface with monitoring device 100. As one example, patient device 124 may receive information from monitoring device 100 through insulin pump 114, where insulin pump 114 relays the information between patient device 124 and monitoring device 100. As another example, patient device 124 may receive information (e.g., glucose level or rate of change of glucose level) directly from monitoring device 100 (e.g., through a wireless link).

In one or more examples, patient device 124 may comprise a user interface with which patient 112 or the clinician may control insulin pump 114. For example, patient device 124 may comprise a touchscreen that allows patient 112 or the clinician to enter a target glucose level. Additionally or alternatively, patient device 124 may comprise a display device that outputs the current and/or past glucose level. In some examples, patient device 124 may output notifications to patient 112, such as notifications if the glucose level is too high or too low, as well as notifications regarding any action that patient 112 needs to take.

Monitoring device 100 may be configured to execute an initialization sequence when inserted into patient 112. The initialization sequence may speed up glucose sensor equilibration and may allow monitoring device 100 (or other CGM and/or in vivo glucose sensors) to provide reliable glucose measurements earlier. Typically, each specific glucose sensor design uses a fixed initialization sequence in a one sequence fits all approach. However, sensor initialization time may vary due to variations in manufacturing of a particular, individual glucose sensor. As such, there may be a range of initialization times for a particular glucose sensor due to manufacturing variations.

Using a one initialization sequence fits all approach does not account for sensor manufacturing variations. As such, the fixed initialization sequence may subject the glucose sensor to potential undesired effects of the initialization sequence, such as performance variability and longevity reduction. This disclosure describes techniques and devices that optimize and/or adjust the initialization of a glucose sensor based on parameters related to manufacturing a particular glucose sensor. In this way, monitoring device 100 may be configured to execute a more optimal initialization sequence. Accordingly, the time between glucose sensor insertion and accurate glucose sensor readings may be shortened, thus leading to increased user satisfaction. A more optimal initialization sequence may also lead to improvement in the longevity of the glucose sensor, i.e., the useful life of the glucose sensor before replacement is necessary.

In addition to manufacturing variations, the length of time the initialization sequence takes to complete may be dependent on the environmental conditions upon insertion. That is, it may take multiple hours for blood glucose and other interstitial fluids to fully hydrate the chemistry stack of the sensing electrodes of monitoring device 100. Until the electrodes reach equilibrium, the readings of the glucose sensor may be inaccurate.

In general, the current (iSig) flowing through the sensing (e.g., working) electrode of monitoring device 100 is indicative of the blood glucose level in the patient's interstitial fluid. However, the current (iSig) behavior of the glucose sensor is not stable until the chemistry stack has reached equilibrium. As such, glucose readings during this initialization period may not be accurate. The amount of glucose present at the time of insertion (e.g., the environmental conditions of the glucose sensor) affects the rate at which the current (iSig) stabilizes given different voltages applied to the working electrode during the initialization sequence. In one example of the disclosure, monitoring device 100 may be configured to adjust the voltage applied to the working electrode during the initialization sequence based on a measured change in the current (iSig), where the measured change in the current is reflective of the environmental conditions of the sensor. In this way, current (iSig) stabilization may be achieved more quickly, and therefore, a shorter initialization sequence may be used. As such, quicker and more accurate glucose readings may be achieved.

Accordingly, as will be explained in more detail below, monitoring device 100 is an example of a device configured to execute an initialization sequence for a glucose sensor, wherein the initialization sequence is based on one or more of parameters related to manufacturing the glucose sensor or environmental conditions of the glucose sensor that are present in vivo. Monitoring device 100 may be further configured to report (e.g., display and/or transmit) glucose levels in patient 112 after the initialization sequence.

Figure 2:
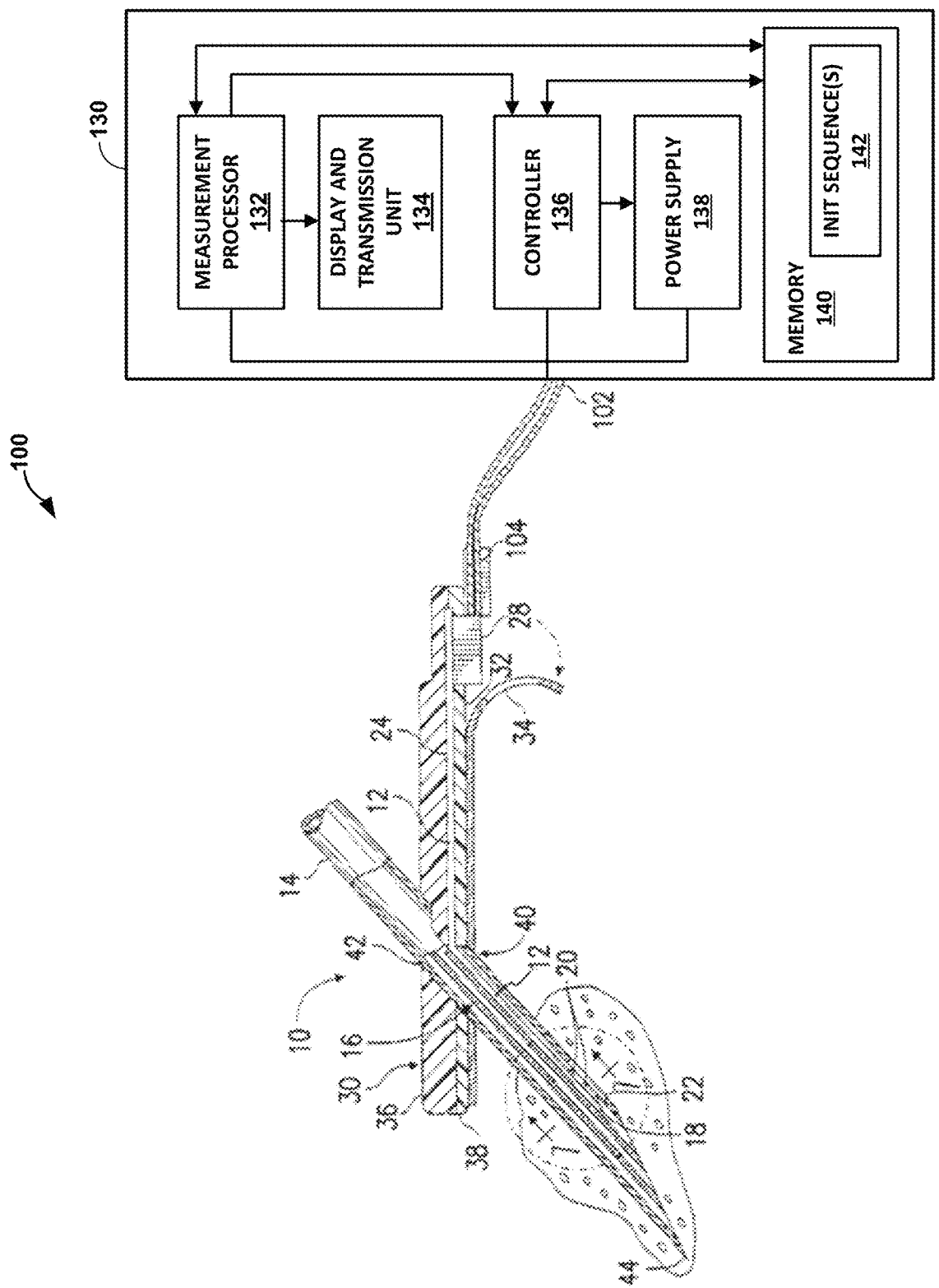
FIG. 2 is a block diagram illustrating an example glucose sensor in accordance with one or more examples described in this disclosure.

FIG. 2 is a block diagram illustrating monitoring device 100 in more detail. In particular, FIG. 2 is a perspective view of a subcutaneous sensor insertion set and a block diagram of sensor electronics device 130 of monitoring device 100 according to an example of the disclosure. As illustrated in FIG. 2, subcutaneous sensor set 10 is provided for subcutaneous placement of an active portion of flexible glucose sensor 12 at a selected site in the body of patient 112. The subcutaneous or percutaneous portion of sensor set 10 includes a hollow, slotted insertion needle 14, and cannula 16. Needle 14 is used to facilitate quick and easy subcutaneous placement of cannula 16 at the subcutaneous insertion site. Inside cannula 16 is glucose sensing portion 18 of glucose sensor 12, which is configured to expose one or more glucose sensor electrodes 20 to the bodily fluids (e.g., blood or interstitial fluid) of patient 112 through window 22 formed in cannula 16. In one example, one or more glucose sensor electrodes 20 may include a counter electrode, a reference electrode, and one or more working electrodes. After insertion, insertion needle 14 is withdrawn to leave cannula 16 with glucose sensing portion 18 and glucose sensor electrodes 20 in place at the selected insertion site.

In particular examples, subcutaneous sensor set 10 facilitates accurate placement of flexible thin film electrochemical glucose sensor 12 of the type used for monitoring specific blood parameters representative of a condition of patient 112. Glucose sensor 12 monitors glucose levels in the body, and may be used in conjunction with automated or semi-automated medication infusion pumps of the external or implantable type as described above to control delivery of insulin to patient 112.

Particular examples of flexible electrochemical glucose sensor 12 are constructed in accordance with thin film mask techniques to include elongated thin film conductors embedded or encased between layers of a selected insulative material such as polyimide film or sheet, and membranes. Glucose sensor electrodes 20 at a tip end of glucose sensing portion 18 are exposed through one of the insulative layers for direct contact with patient blood or other body fluids, when glucose sensing portion 18 (or active portion) of glucose sensor 12 is subcutaneously placed at an insertion site. Glucose sensing portion 18 is joined to connection portion 24 that terminates in conductive contact pads, or the like, which are also exposed through one of the insulative layers. In other examples, other types of implantable sensors, such as chemical based, optical based, or the like, may be used.

Connection portion 24 and the contact pads are generally adapted for a direct wired electrical connection to a suitable monitor or sensor electronics device 130 for monitoring a condition of patient 112 in response to signals derived from glucose sensor electrodes 20. Connection portion 24 may be conveniently connected electrically to the monitor or sensor electronics device 130 or by connector block 28. Thus, in accordance with examples of the disclosure, subcutaneous sensor sets 10 may be configured or formed to work with either a wired or a wireless characteristic monitor system.

Glucose sensor electrodes 20 may be used in a variety of sensing applications and may be configured in a variety of ways. For example, glucose sensor electrodes 20 may be used in physiological parameter sensing applications in which some type of biomolecule is used as a catalytic agent. For example, glucose sensor electrodes 20 may be used in a glucose and oxygen sensor having a glucose oxidase (GOx) enzyme catalyzing a reaction with glucose sensor electrodes 20. Examples of this disclosure may be described with reference to a GOx layer, but the techniques of this disclosure may be used with any type of enzyme that may be used in a glucose sensor. Glucose sensor electrodes 20, along with a biomolecule or some other catalytic agent, may be placed in a human body in a vascular or non-vascular environment. For example, glucose sensor electrodes 20 and biomolecules may be placed in a vein and be subjected to a blood stream, or may be placed in a subcutaneous or peritoneal region of the human body.

Sensor electronics device 130 may include measurement processor 132, display and transmission unit 134, controller 136, power supply 138, and memory 140. Sensor electronics device 130 may be coupled to the sensor set 10 by cable 102 through a connector that is electrically coupled to connector block 28 of connection portion 24. In other examples, the cable may be omitted and sensor electronics device 130 may include an appropriate connector for direct connection to connection portion 104 of sensor set 10. Sensor set 10 may be modified to have connector portion 104 positioned at a different location, e.g., on top of the sensor set to facilitate placement of sensor electronics device 130 over the sensor set.

In examples of the disclosure, measurement processor 132, display and transmission unit 134, and controller 136 may be formed as separate semiconductor chips. However, other examples may combine measurement processor 132, display and transmission unit 134, and controller 136 into a single or multiple customized semiconductor chips. In general, measurement processor 132 may be configured to receive a current and/or voltage from glucose sensors 20. Glucose sensors 20 may generate a sensor signal indicative of a concentration of a physiological characteristic being measured. For example, the sensor signal may be indicative of a blood glucose reading. The sensor signal may be measured at a working electrode of glucose sensors 20. In an example of the disclosure, the sensor signal may be a current (e.g., iSig) measured at the working electrode. In another example of the disclosure, the sensor signal may be a voltage measured at the working electrode of glucose sensors 20.

Measurement processor 132 receives the sensor signal (e.g., a measured current or voltage) after the sensor signal is measured at glucose sensors 20 (e.g., the working electrode). Measurement processor 132 may receive the sensor signal and calibrate the sensor signal utilizing reference values. In an example of the disclosure, the reference values are stored in a reference memory (e.g., memory 140) and provided to measurement processor 132. Based on the sensor signals and the reference values, measurement processor may determine a blood glucose measurement. Measurement processor 132 store the blood glucose measurements in memory 140. The sensor measurements may be sent to display and transmission unit 134 to be either displayed on a display in a housing of monitoring device 100 or transmitted to an external device.

Memory 140 may be any type of memory device and may be configured to store glucose measurements produced by measurement processor 132, reference values used to determine glucose measurements from sensor signals, or other data used and/or produced by measurement processor 132 and/or controller 136. In some examples, memory 140 may further store software and/or firmware that is executable by measurement processor 132 and/or controller 136. As will be explained in more detail below, memory 140 may further store initialization (init) sequence(s) 142. Init sequence(s) 142 may include data for one or more initialization sequences that may be executed by controller 136.

Sensor electronics device 130 may be a monitor which includes a display to display physiological characteristics readings. Sensor electronics device 130 may also be installed in a desktop computer, a pager, a television including communications capabilities, a laptop computer, a server, a network computer, a personal digital assistant (PDA), a portable telephone including computer functions, an infusion pump including a display, a glucose sensor including a display, and/or a combination infusion pump/glucose sensor. Sensor electronics device 130 may be housed in a mobile phone, a network device, a home network device, or an appliance connected to a home network.

Power supply 138 may be a battery. The battery can include three series silver oxide 357 battery cells. In other examples, different battery chemistries may be utilized, such as lithium based chemistries, alkaline batteries, nickel metalhydride, or the like, and a different number of batteries may be used. Sensor electronics device 130 provides power to the sensor set 10 via power supply 138 through cable 102 and cable connector 104.

Controller 136 may be a processor, digital signal processors (DSPs), application specific integrated circuits (ASICs), field programmable gate arrays (FPGAs), or any other equivalent integrated or discrete logic circuitry. In some examples controller 136 may be configured to execute software program code and/or firmware that causes power supply 138 to supply a specific voltage or current to glucose sensors 20. Glucose sensors 20 may receive the voltage level or value. In an example of the disclosure, a counter electrode of glucose sensors 20 may receive the reference voltage from power supply 138. The application of the voltage level causes glucose sensors 20 to create a sensor signal (e.g., a current through a working electrode) indicative of a concentration of a physiological characteristic being measured (e.g., blood glucose).

Figure 3:
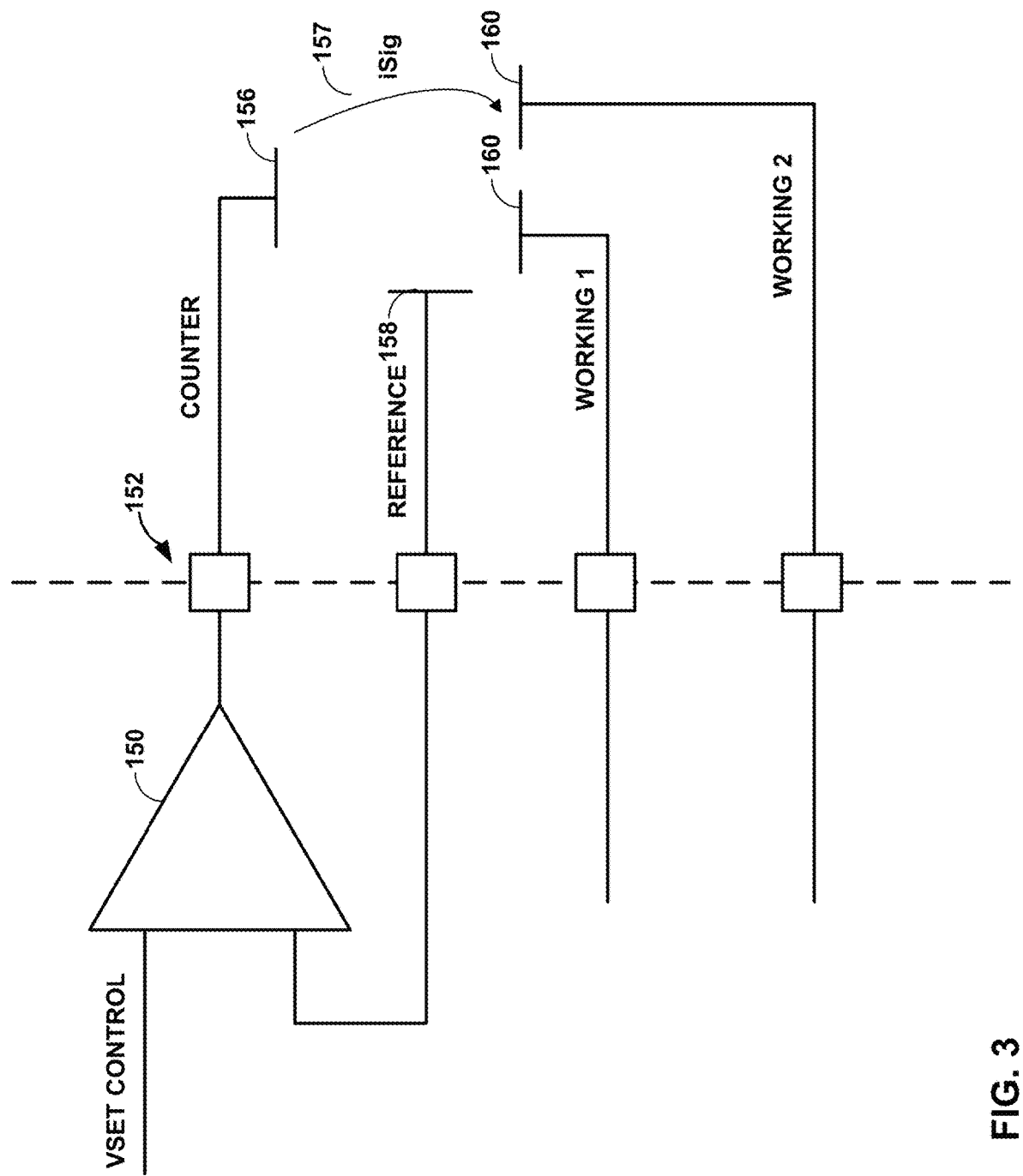
FIG. 3 is a block diagram illustrating example sensor electrodes and a voltage being applied to the sensor electrodes according to an example of the disclosure.

FIG. 3 is a block diagram illustrating example sensor electrodes and a voltage being applied to the sensor electrodes according to an example of the disclosure. In the example in FIG. 3, an operational amplifier (op amp) 150 or other servo controlled device may connect to the sensor electrodes of glucose sensor 20 through a circuit/electrode interface 152. Op amp 150, utilizing feedback through the sensor electrodes, attempts to maintain a prescribed voltage between reference electrode 158 and a working electrode 160 (e.g., VSET) by adjusting the voltage at counter electrode 156. In some examples, the voltage at reference electrode 158 is 850 mv.

Current 157 (iSig) may then flow from a counter electrode 156 to a working electrode 160. Counter 156 balances the chemical reaction that is occurring at working electrode 160. Measurement processor 132 of FIG. 2 may measure current 157 to determine the electrochemical reaction between the sensor electrodes and the biomolecule of a sensor that has been placed in the vicinity of the sensor electrodes and used as a catalyzing agent. The circuitry disclosed in FIG. 3 may be utilized in a long-term or implantable sensor or may be utilized in a short-term or subcutaneous sensor.

Returning to FIG. 2, as discussed above, during initial implantation or insertion of monitoring device 100 into patient 112, glucose sensor 20 may provide inaccurate readings due to the adjusting of glucose sensor 20 to patient 112 and also electrochemical byproducts caused by the catalyst utilized in the sensor. A stabilization period is needed for many sensors in order for the sensor to provide accurate readings of the physiological parameter of the subject (e.g., blood glucose). During the stabilization period, monitoring device 100 may not provide accurate blood glucose measurements. Users and manufacturers of the sensors may desire to improve the stabilization timeframe for the sensor so that the sensors can be utilized quickly after insertion into the subject's body or a subcutaneous layer of the subject.

In accordance with the techniques of this disclosure, controller 136 may cause sensor electronics 130 to execute an initialization sequence that causes quicker stabilization of glucose sensors 20. In particular, controller 136 may execute an initialization sequence for glucose sensor 20, wherein the initialization sequence is based on one or more of parameters related to manufacturing glucose sensor 20 and/or environmental conditions of the glucose sensor that are present in vivo. In general, an initialization sequence may include a pattern of voltages and/or currents applied at or through a working electrode of glucose sensors 20 at a particular length and duty cycle. In one example, controller 136 may determine, select, and/or update an initialization sequence based in part on the amount of blood glucose in the blood or interstitial fluid of patient 112 at the time of insertion. Controller 136 may then cause sensor electronics 130 (e.g., display and transmission unit 134) to report glucose levels in patient 112 after the initialization sequence has completed.

In one example of the disclosure, controller 136 may be configured to execute an initialization sequence based on one or more of parameters related to manufacturing glucose sensor 20. Such an initialization sequence may improve the usability of monitoring device 100 by starting faster and potentially improving longevity. In general, the execution of an initialization sequence may allow for accelerated hydration of the chemistry stack of glucose sensor 20 with interstitial fluid, anolytes, and other fluids present. The initialization sequence may also accelerate the electrical equilibrium and/or stabilization of glucose sensor 20 so that accurate glucose readings may be reported.

Typically, each specific glucose sensor design uses a fixed initialization sequence in a one sequence fits all approach. However, sensor initialization time may vary due to variations in manufacturing of a particular, individual glucose sensor. As such, there may be a range of initialization times for a particular glucose sensor due to manufacturing variations. Using a one initialization sequence fits all approach does not account for manufacturing variations. As such, the fixed initialization sequence may subject the glucose sensor to potential undesired effects of the initialization sequence, such as performance variability and longevity reduction.

This disclosure describes techniques and devices that optimize and/or adjust the initialization of glucose sensor 20 of monitoring device 100 based on parameters related to manufacturing a particular glucose sensor 20. In this way, monitoring device 100 may execute a more optimal initialization sequence. Accordingly, the time between glucose sensor insertion and accurate glucose sensor readings may be shortened, thus leading to increased user satisfaction. A more optimal initialization sequence may also lead to improve the longevity of the glucose sensor. Improving the function of monitoring device 100 may further improve the capability of a closed loop system (e.g., the system 110 of FIG. 1). The techniques of this disclosure may be used with any type of in vivo glucose sensor, including a continuous glucose monitor (CGM), an all-in-one patch system, and/or a closed loop system that may include a CGM and an insulin pump (e.g., system 110).

Figure 4:
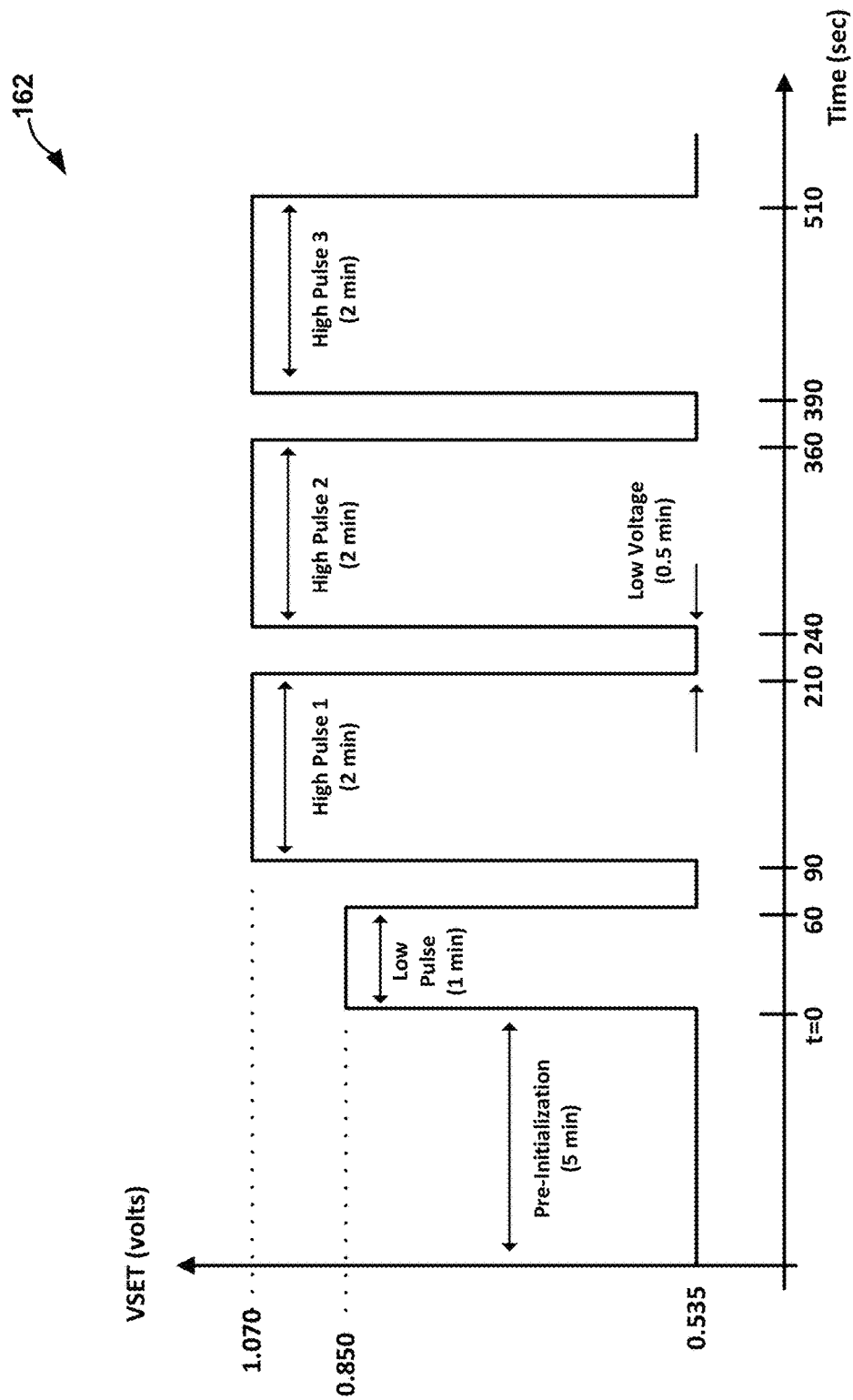
FIG. 4 is a conceptual diagram illustrating an example initialization sequence for a glucose sensor in accordance with one or more examples described in this disclosure.

FIG. 4 is a conceptual diagram illustrating an example initialization sequence 162 for a glucose sensor. As shown in FIG. 4, initialization sequence 162 includes a pre-initialization period of 5 minutes where the VSET level is kept low (e.g., at or below approximately 535 mV). This is followed by a 1 minute low pulse at a first, higher level (e.g., 850 mV). The VSET is then cycled back to the low level (e.g., of 535 mV) for 30 seconds before continuing with a 2 minute high pulse at a second, higher level (e.g., 1070 mV) that is higher than the first, higher level, followed by a 30 second low VSET level (e.g., approximately 535 mV) duty cycle for 3 cycles. While initialization sequence 162 may be useful for particular types of glucose sensors, initialization sequence 162 may not be optimal for all types and configuration of glucose sensors, nor may initialization sequence 162 be optimal for every glucose sensor of the same type. That is, slight manufacturing variations in glucose sensors of the same type may be used to determine a particular initialization sequence for each individual glucose sensor.

Figure 5:
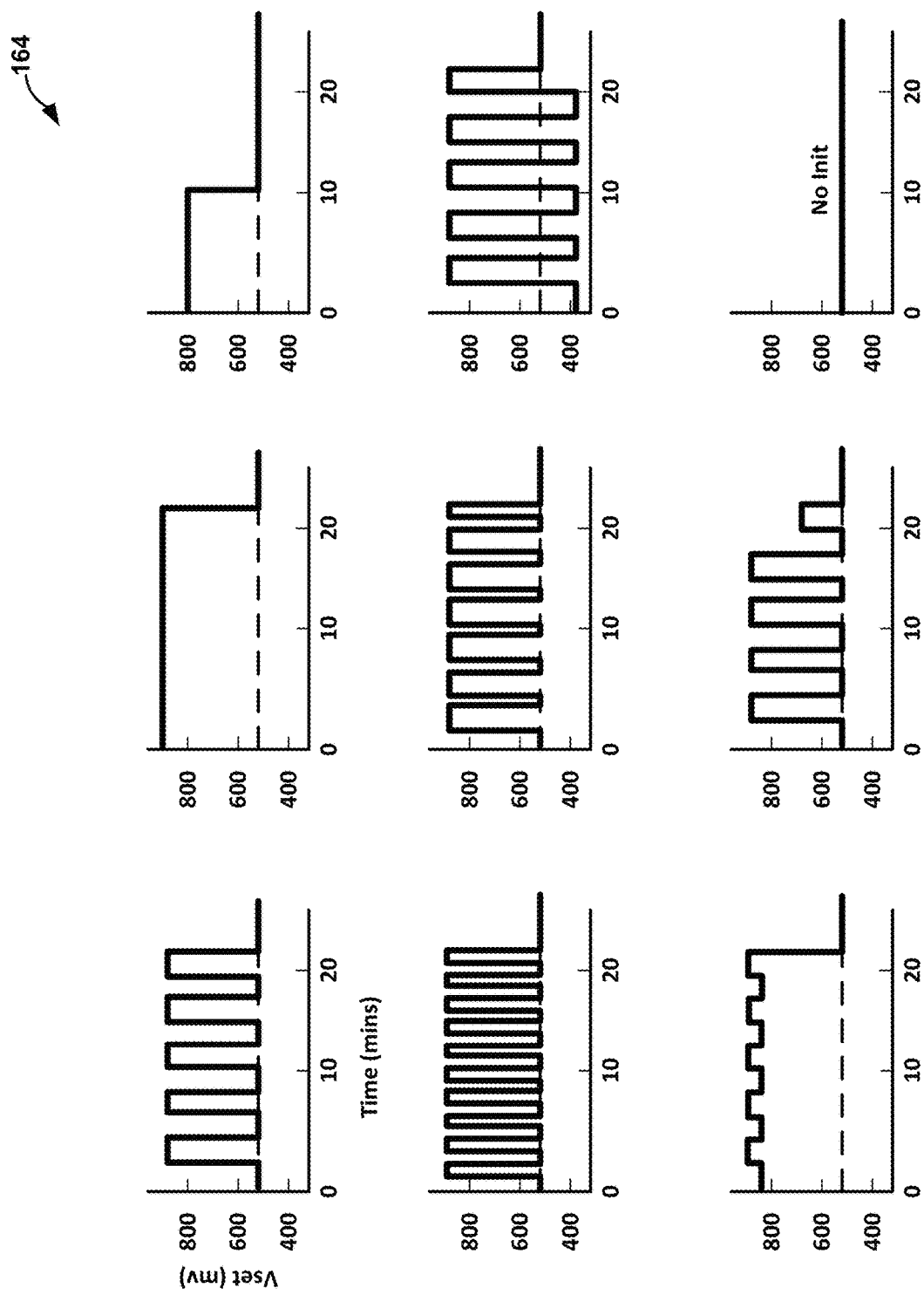
FIG. 5 is a conceptual diagram illustrating other example initialization sequences for a glucose sensor in accordance with one or more examples described in this disclosure.

FIG. 5 is a conceptual diagram illustrating other example initialization sequences 164 for a glucose sensor in accordance with one or more examples described in this disclosure. As shown in FIG. 5, initialization sequences 164 illustrate different initialization sequences in terms of duration, voltage, and/or duty cycle, including options for no initialization sequence (No init). As will be explained in more detail below, controller 136 or another processor may determine a particular initialization sequence from among a plurality of initialization sequences based on one or more parameters related to manufacturing parameters of glucose sensor 20. In some examples, the determined initialization sequence may be stored as software and/or firmware in memory 140 of FIG. 2 (see Init Sequence(s) 142).

Figure 6:
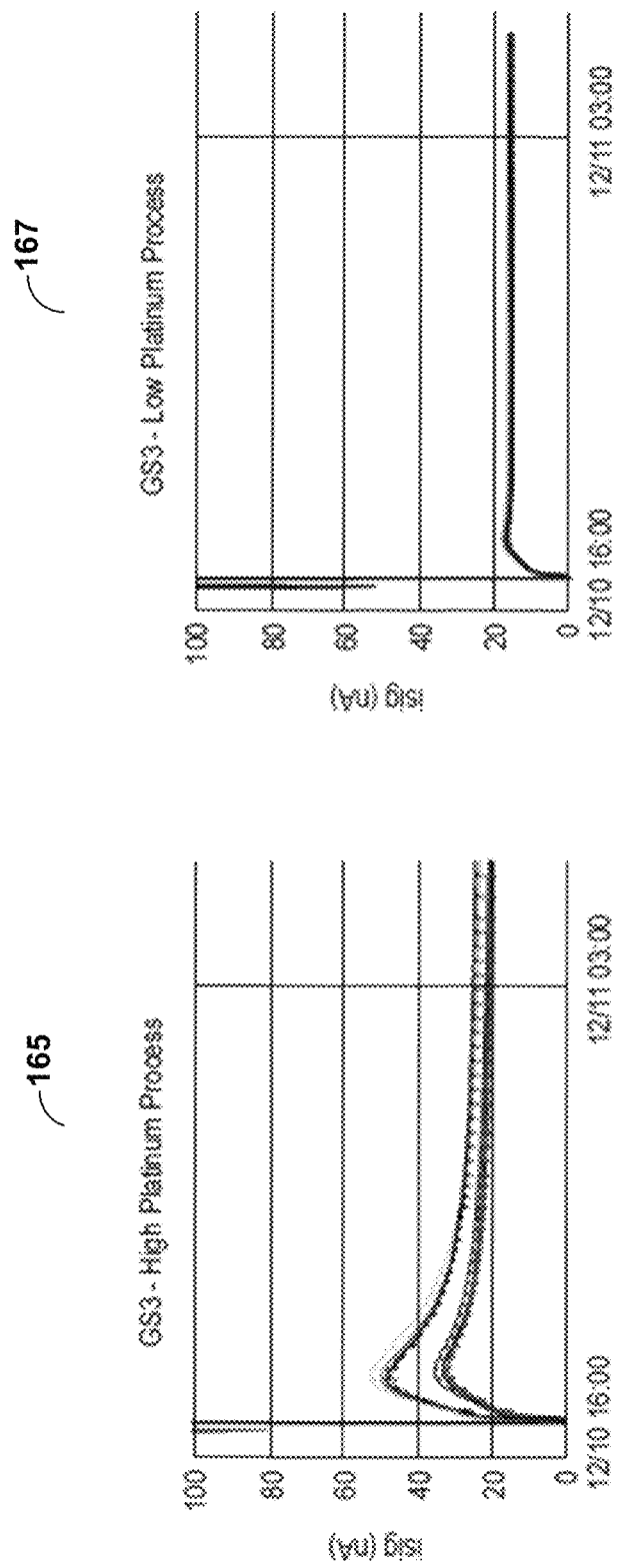
FIG. 6 is a conceptual diagram illustrating example initialization sequence responses due to different manufacturing techniques of a glucose sensor.

FIG. 6 is a conceptual diagram illustrating example initialization sequence responses due to different manufacturing techniques of a glucose sensor. In particular, FIG. 6 illustrates a current (iSig) response through a working electrode of a glucose sensor based on the amount of platinum used in constructing a glucose sensor. Response 165 shows the current equilibrium time for a glucose sensor that uses a relatively high platinum process. Response 167 shows the current equilibrium time for a glucose sensor that uses a relatively low platinum process. As can be seen in FIG. 6, a glucose sensor manufactured with a relatively low platinum process may reach current (iSig) equilibrium faster than a glucose sensor manufactured with a high platinum process. A shorter equilibrium time for the current may indicated the need for a shorter initialization sequence. As such, the amount of platinum used in the manufacturing process may be used as one criteria for determining the initialization sequence.

Figure 7:
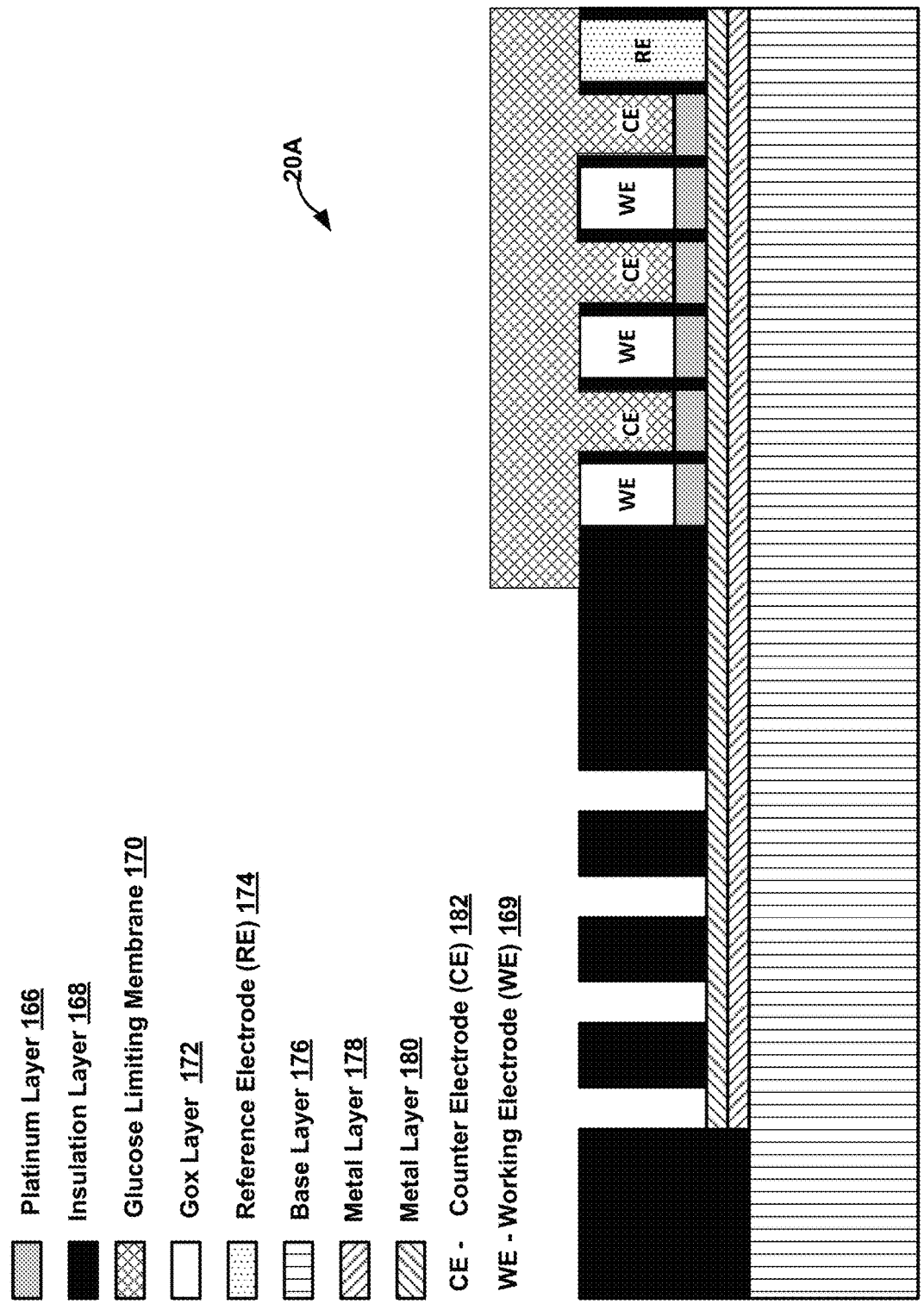
FIG. 7 is a conceptual diagram illustrating example layers of a glucose sensor.

Other parameters related to manufacturing a glucose sensor that may be used to determine an initialization sequence include one or more of a platinum surface area ratio (SAR), a glucose oxidase (Gox) activity, a Gox thickness, an amount of an intermediate layer between an enzyme layer and a glucose limiting membrane (e.g., a high density amine (HAD) layer, a glucose limiting membrane (GLM) thickness, and/or a glucose limiting membrane (GLM) permeability. As stated above, examples of this disclosure may be described with reference to a GOx layer, but the techniques of this disclosure may be used with any type of enzyme that may be used in a glucose sensor. FIG. 7 is a conceptual diagram illustrating example layers of glucose sensor 20A. Glucose sensor 20A is one example of glucose sensor 20 of FIG. 2.

As shown in FIG. 7, glucose sensor 20A includes working electrode (WE) 169, counter electrode (CE) 182, and reference electrode (RE) 174. Glucose sensor 20A further includes base layer 176, metal layer 178 (e.g., gold or chrome), metal layer 180 (e.g., gold or chrome), and insulation layer 168. The electrodes of glucose sensor 20A are built upon and between base layer 176, metal layer 178, metal layer 180, and insulation layer 168.

Working electrode 169 may include platinum layer 166, Gox layer 172, and glucose limiting membrane (GLM) 170. Platinum layer 166 may be defined by a surface area ratio (SAR). The platinum SAR may define the level of roughness of an electrode. For example, a SAR of 110 would indicate a relatively rough sensor, a SAR of 50 would indicate a medium roughness sensor, and a SAR of 5 would indicate a relatively smooth sensor. Gox layer 172 is a catalytic agent (e.g., an enzyme) that reacts with blood glucose and causes a particular current to flow through working electrode 169 based on the amount of blood glucose present in the interstitial fluid. GLM 170 may be the outermost layer of glucose sensor 20A and may be configured to control the diffusion of glucose onto Gox layer 172.

Figure 8:
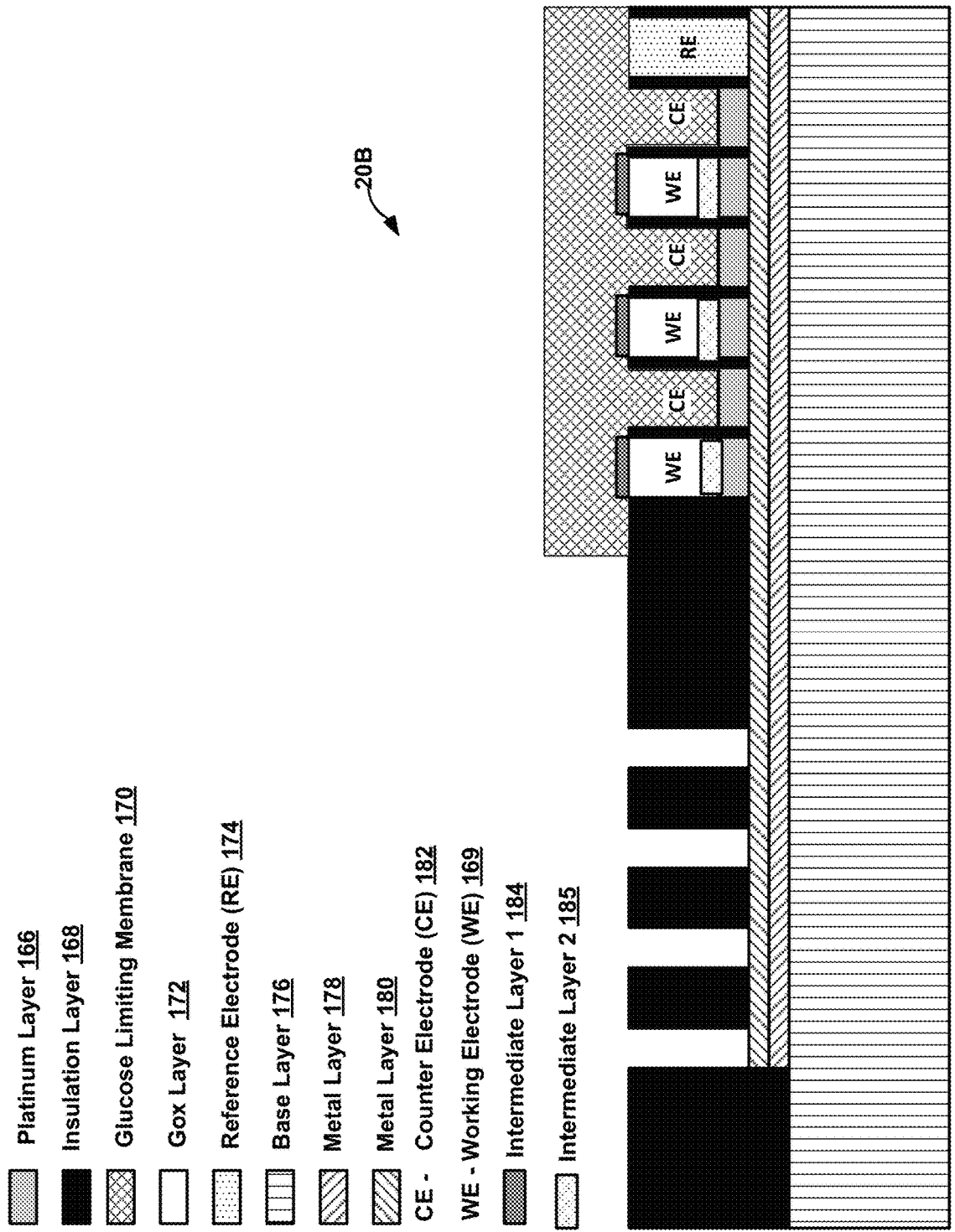
FIG. 8 is a conceptual diagram illustrating another example of the layers of a glucose sensor.

FIG. 8 is a conceptual diagram illustrating another example of the layers of a glucose sensor. FIG. 8 shows a glucose sensor 20B that is similar to glucose sensor 20A. However, glucose sensor 20B may further include intermediate layer 1 184 and intermediate layer 2 185. In some examples, intermediate layer 1 184 may be a high density amine (HDA) layer. In general, intermediate layer 1 184 is deposited between Gox layer 172 and GLM 170 in order to aid in adhesion of GLM 170. Intermediate layer 2 185 may be an interference rejection membrane (IRM) deposited between Gox layer 172 and platinum layer 166. Intermediate layer 2 185 may be configured to block certain chemicals from reaching the electrode.

Returning to FIG. 2, controller 136 may execute one or more initialization sequence(s) 142 that are based on parameters related to manufacturing glucose sensor 20. Example parameters that may be used to determine the initialization sequence may include platinum SAR, Gox activity, Gox thickness, intermediate layer (e.g.,) amount, GLM thickness, GLM permeability, an IRM thickness, an IRM uniformity, and/or an IRM permeability. As discussed above, platinum SAR is a measure of the roughness of the platinum layer of a glucose sensor. Gox activity generally indicates how much glucose oxidase enzyme is loaded into the Gox layer. The Gox activity is generally indicative of how much and how fast glucose is converted to hydrogen peroxide by the sensor. Gox thickness is a measure of the thickness of a Gox layer of a glucose sensor. GLM thickness is a measure of the thickness of a GLM of a glucose sensor. GLM permeability is a measure of how much glucose a GLM allows to interact with the Gox layer. The intermediate layer amount refers to a measure of how much intermediate layer is used between the GLM and Gox layer. The IRM thickness, uniformity, and/or permeability generally relates to the ability of the IRM layer to block chemicals from the electrode (e.g., the platinum layer).

The various manufacturing parameters above may cause changes in iSig performance relative to the amount of glucose present in vivo. In general, a higher starting iSig at a higher glucose results in a shorter stabilization time. A lower starting iSig at a lower glucose results in a longer stabilization time. Accordingly, the manufacturing parameters above may be used to determine the length and Vset of the initialization sequence.

In general, as platinum SAR increases, a higher iSig level is present. Similarly, a higher Gox Activity generally correlates with an increase in iSig. Also, an increase in Gox thickness at a constant Gox activity correlates with an increase in iSig. A decrease in GLM thickness and/or an increase in GLM permeability generally correlates with an increase in iSig. The IRM thickness, uniformity, and/or permeability may also affect stabilization time.

Figure 9:
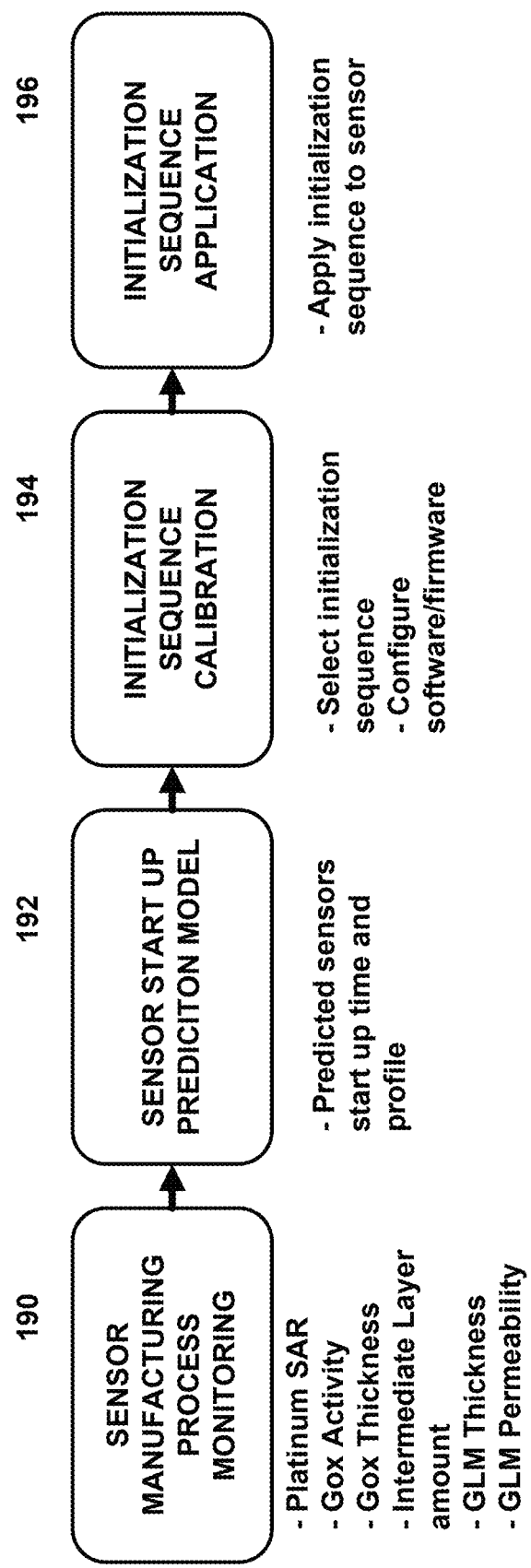
FIG. 9 is a flow diagram illustrating a process for determining an initialization sequence based on one or more manufacturing parameters.

FIG. 9 is a flow diagram illustrating a process for determining an initialization sequence based on one or more manufacturing parameters. The techniques of FIG. 9 may be performed by sensor electronics 130 (e.g., see FIG. 2), patient device 124 (see FIG. 1), or another processor external to system 110 that is used during manufacturing of glucose sensor 20 (see FIG. 2). In that regard, the techniques of FIG. 9 will be described with reference to a generic processor.

In sensor manufacturing process monitoring 190, a processor may receive and monitor one or more parameters related to manufacturing a glucose sensor. As discussed above, such parameters may include platinum SAR, Gox activity, Gox thickness, intermediate layer amount, GLM thickness, and/or GLM permeability. Of course, other parameters may be used, such as the type, placement, and number of electrodes used on a glucose sensor. The processor may then run a sensor startup prediction model 192. The sensor startup prediction model 192 may predict the sensor start up time and expected iSig profile based on the type of glucose sensor being manufactured.

The processor may then execute an initialization sequence calibration 194. As discussed above, one or more of the parameters related to manufacturing the glucose sensor may be used to determine the voltage, duty cycle, and/or duration of an initialization sequence. The processor may select an initialization sequence and/or modify an initialization sequence and then configure software and/or firmware to execute the selected initialization sequence. As will be discussed in more detail below, in some examples, the processor may configure multiple initialization sequences. Then the processor may perform the initialization sequence application 196 to apply the initialization sequence to a particular glucose sensor. This may include loading the configured software and/or firmware onto sensor electronics 130 (see FIG. 2).

Figure 10:
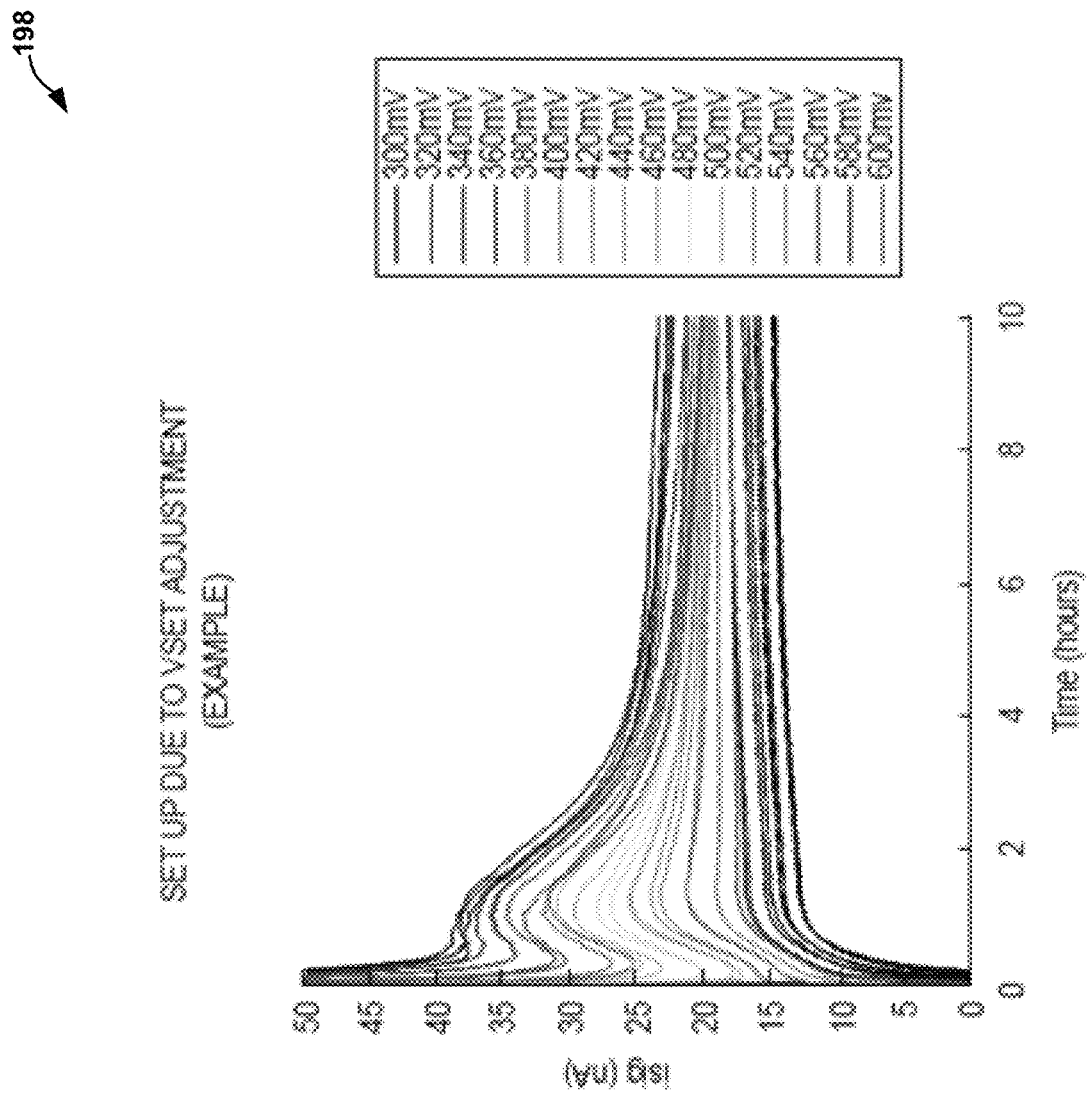
FIG. 10 is a conceptual diagram illustrating example initialization sequences responses for different voltage levels.

FIG. 10 is a conceptual diagram illustrating example initialization sequences responses for different voltage levels. As shown in plot 198, current (iSig) behavior varies for different Vset levels. Adjusting Vset as part of an initialization sequence may improve glucose sensor start up time for different sensor variants (e.g., sensors with different platinum SAR variants).

Returning to FIG. 2, in other examples of the disclosure, controller 136 may be configured to execute an initialization sequence that is based on environmental conditions of glucose sensor 20 that are present in vivo. That is, the chemical makeup of the interstitial fluid of patient 112, including the amount of blood glucose, may affect the stabilization time of an initialization sequence. In this context, the stabilization time may refer the time it takes for glucose sensor 20 to produce a stable current (iSig) through the working electrode and/or the time it takes monitoring device 100 to report accurate blood glucose measurements.

As discussed above, some example glucose sensors take up to two hours to start displaying glucose values. Users typically desire to see their sensor glucose value as quickly as possible upon sensor insertion. However, it takes time for the sensor to fully hydrate when inserted in vivo. The glucose sensor has to be hydrated for glucose (and hydrogen peroxide, in some examples) to diffuse into the sensor chemistry stack. In order to accelerate the time until accurate blood glucose levels may be obtained, controller 136 executes an initialization sequence that is applied to the working electrode(s) of glucose sensor 20. However, the current (iSig) behavior of glucose sensor is dependent on glucose level of the interstitial fluid to which the sensor is exposed. For example, the glucose level of patient 112 may affect the rate of change of various sensor signals, including the current (iSig) signal that is used to determine a blood glucose level. In accordance with the techniques of this disclosure, controller 136 may be configured to select and/or alter init sequence(s) 142 based on a detected rate of change (e.g., a slope) of a sensor signal received from glucose sensor 20. In one example, the sensor signal is a current (iSig) through a working electrode of glucose sensor 20. By selecting and/or dynamically adjusting the initialization sequence based on the environmental conditions of glucose sensor 20, the techniques of this disclosure may reduce the time it takes for monitoring device 100 to report accurate glucose readings.

Figure 11:
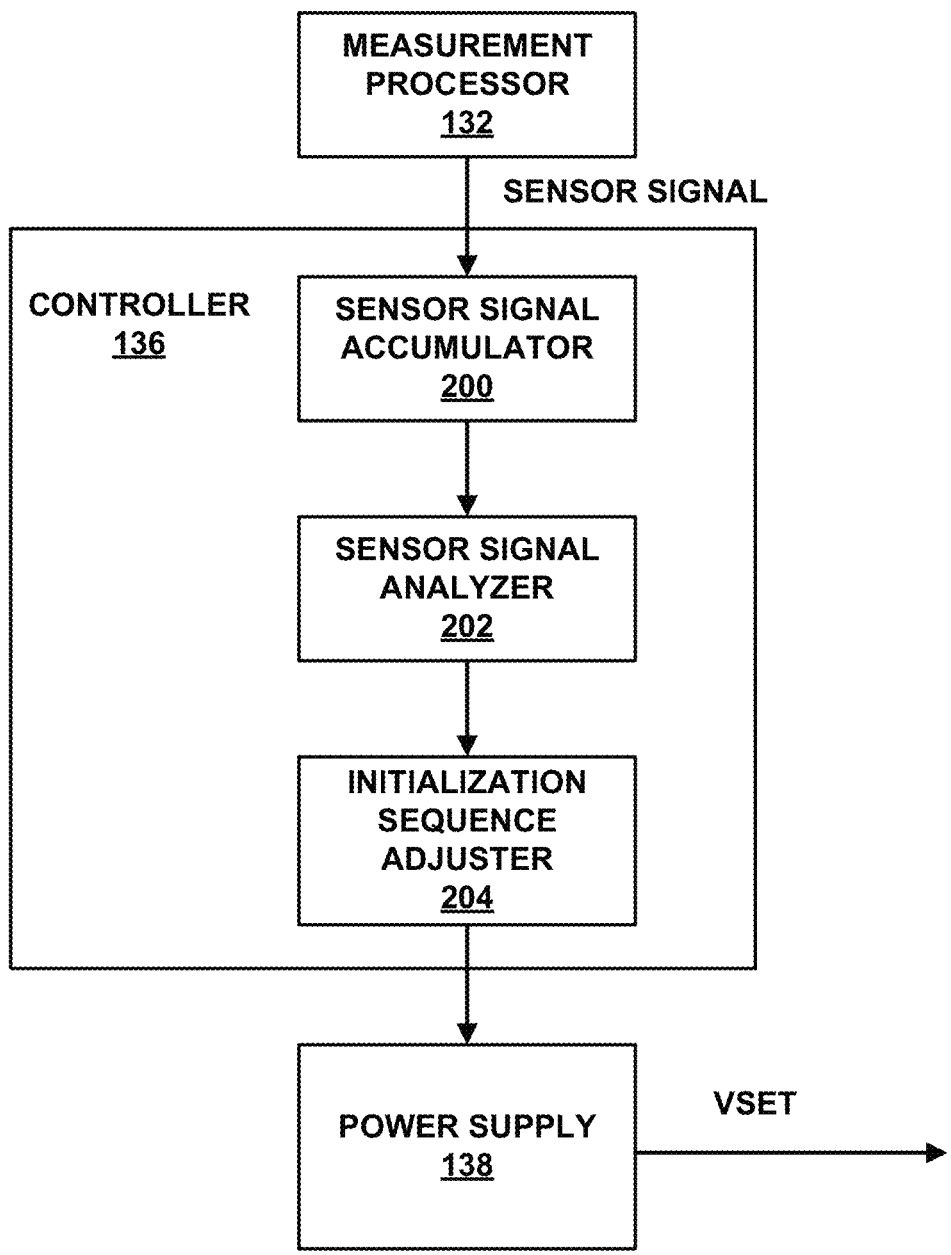
FIG. 11 is a block diagram illustrating an example glucose sensor configured to adjust an initialization sequence based on environmental conditions of the glucose sensor.

FIG. 11 is a block diagram illustrating an example glucose sensor configured to adjust an initialization sequence based on environmental conditions of the glucose sensor. As shown in FIG. 11, measurement processor 132 may provide a sensor signal to controller 136. In one example, the sensor signal is a current (iSig) through a working electrode of glucose sensor 20. Sensor signal accumulator 200 of controller 136 may accumulate current values over a period of time. Sensor signal analyzer 202 may then calculate a rate of change of the current values. For example, sensor signal analyzer 202 may calculate the slope of a plot of the current (e.g., iSig).

Initialization sequence adjuster 204 may then use the calculated slope of the current to make changes in the initialization sequence being executed. In one example, initialization sequence adjuster 204 may use the calculated slope of the current to instruct power supply 138 to adjust the applied voltage (Vset) to the working electrode of the glucose sensor 20 (Vset) in real-time. In this way, each individual monitoring device 100 may undergo a unique initialization sequence which would account for glucose levels at the time of insertion into a patient.

In a more general example, controller 136 or another structural component of sensors electronics 130 may be configured to execute an initialization sequence that is based on environmental conditions of glucose sensor 20 that are present in vivo. Controller 136 may be configured to measure a current through an electrode of the glucose sensor, calculate a slope of the current (e.g., iSig) over time, and adjust a voltage (e.g., Vset) at the electrode based on the slope. In one example, the electrode is a working electrode configured to sense glucose levels. In one example, adjusting the voltage at the electrode based on the slope includes raising the voltage at the electrode in the case the slope is higher than a first threshold. In another example, adjusting the voltage at the electrode based on the slope includes lowering the voltage at the electrode in the case the slope is lower than a second threshold. In some examples, the thresholds may be +/−1 percent to 20 percent of the maximum angle of the slope (e.g., 90 degrees) to prevent debouncing. In some examples, the first threshold is higher than the second threshold. In other examples, the first and second thresholds are the same.

Controller 136 may be configured to use the absolute value of the slope of the current (iSig) to determine changes in Vset for the initialization sequence. In general, larger slopes (e.g., higher rate of change, either up or down) indicate the need for higher Vsets, while lower slopes (e.g., lower rates of change, either up or down) indicate the Vsets may be reduced. Controller 136 may be configured to monitor the current continuously during the initialization sequence. For example, controller 136 may take a current measurement once a minute or more frequently. In some examples, controller 136 may start taking measurements after a predetermined time after insertion into patient 112 (e.g., 2 minutes). Controller 136 may calculate the slope of the current over an interval of minutes (e.g., 2 minute intervals, 3 minute intervals, etc.). In some examples, controller 136 may be configured to calculate the slope of the current as a moving average using various window sizes.

In other examples of the disclosure, controller 136 may use sensor signals other than current (iSig) through the working electrode to determine adjustments to an initialization sequence. In other examples, controller 136 may accumulate and measure changes in electro chemical impedance spectroscopy (EIS) (real and imaginary impedance at different frequencies), voltage at a counter electrode, and/or current through a background electrode. A background electrode is similar to a working electrode, but does not include Gox layer for breaking down and sensing glucose. Like current through a working electrodes, larger slopes/changes in these other sensor signals may indicate a need for a higher VSET, whole lower slopes/changes in these other sensor signals may indicate a need for a lower Vset at the working electrode.

In one example of the disclosure, controller 136 is configured to measure an electro chemical impedance spectroscopy of an electrode of a glucose sensor (e.g., glucose sensor 20), calculate a change of the electro chemical impedance spectroscopy over time, and a voltage at the electrode based on the change of the electro chemical impedance spectroscopy. In another example of the disclosure, controller 136 is configured to measure a voltage at a counter electrode of a glucose sensor (e.g., glucose sensor 20), calculate a change of the voltage at the counter electrode over time, and adjust a working voltage at a working electrode based on the change of the voltage at the counter electrode. In another example of the disclosure, controller 136 is configured to measure a current through a background electrode of a glucose sensor (e.g., glucose sensor 20), calculate a slope of the current over time over time, and adjust a working voltage at a working electrode based on the change of the voltage at the counter electrode.

In other examples of the disclosure, controller 136 may execute and/or adjust an initialization sequence for a glucose sensor based on both one or more parameters related to manufacturing the glucose sensor, as discussed above, in combination with environmental conditions (e.g., blood glucose levels) upon insertion in patient 112. As one example, with reference to FIG. 2, memory 140 may store a plurality of init sequence(s) 142. Each of the plurality of init sequence(s) 142 may be associated with different blood glucose levels. Controller 136 may determine an initialization sequence from a plurality of initialization sequences based on the environmental conditions of the glucose sensor that are present in vivo. In some examples, the plurality of initialization sequences may have also been based on the one or more of parameters related to manufacturing the glucose sensor, as discussed above.

In general, the plurality of initialization sequences may vary in terms of voltage curves, starting points of the voltage curves, ending points of the voltage curves, or durations of the voltage curves, among other parameters. For example, init sequence(s) 142 may include three or more initialization sequences that have different voltage curves. In one example, the voltage curves may have different Vset levels. In other examples, the voltage curves may vary in duration. In still other examples, the voltage curves may have different starting Vsets, but may end on the same Vset level.

In another example of the disclosure, init sequence(s) 142 may include an initialization sequence that is based on one or more of parameters related to manufacturing the glucose sensor 20. Controller 136 may be configured to execute this initialization sequence for a first period of time upon insertion into patient 112. After this first period of time, controller 136 may then measure a sensor signal (e.g., iSig) and adjust the initialization sequence using any of the techniques described above (e.g., based on environmental conditions of the glucose sensor that are present in vivo).

Figure 12:
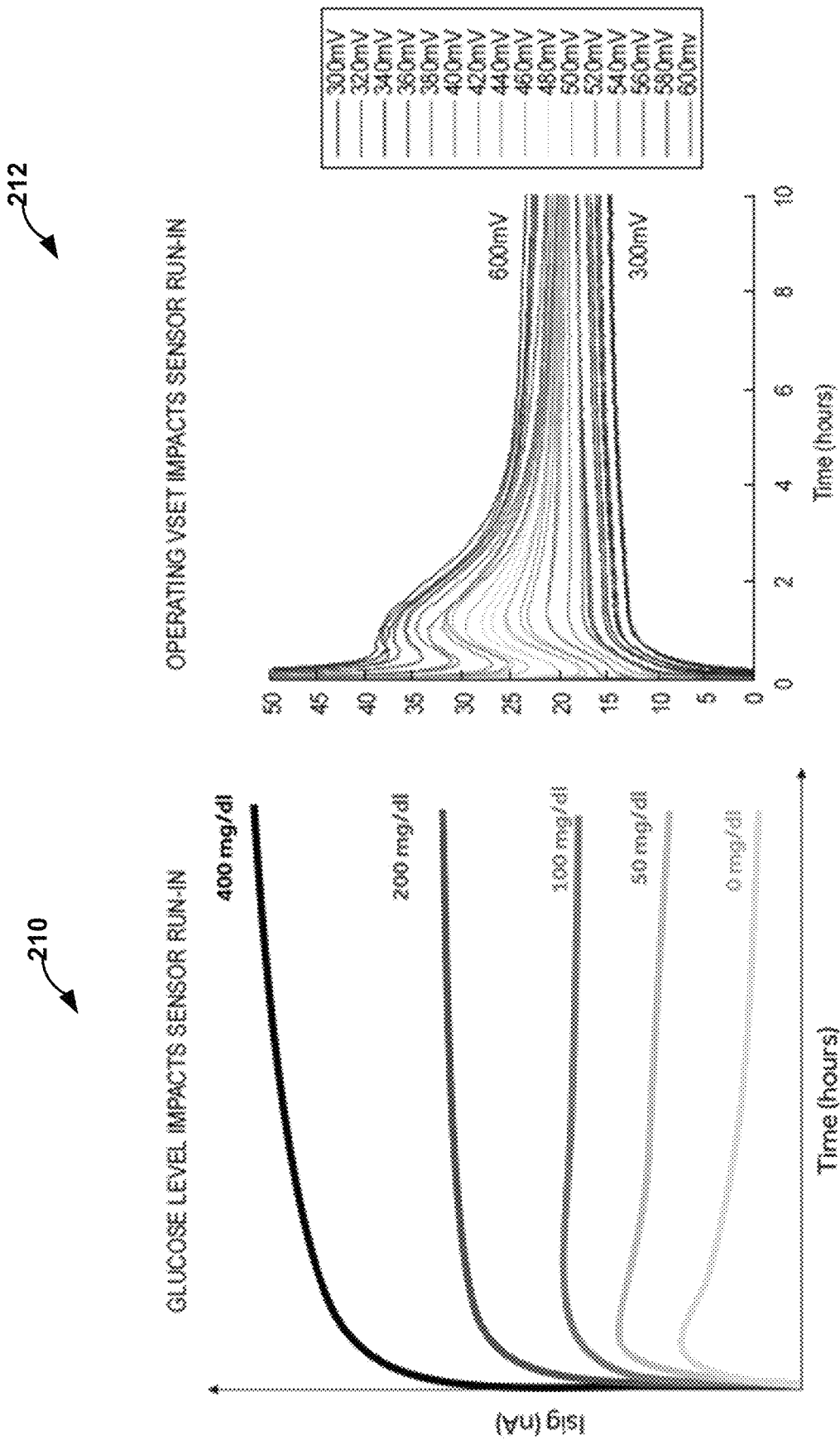
FIG. 12 is a conceptual diagram illustrating example initialization sequences responses for different glucose levels and voltage levels.

FIG. 12 is a conceptual diagram illustrating example initialization sequences responses for different glucose levels and voltage levels. Plot 210 shows the change in current (iSig) for different glucose levels. Plot 212 shows the change in current (iSig) for different Vset levels. As can be seen, both glucose levels and the Vset level at the working electrode of glucose sensor 20 affects how quickly the current (iSig) stabilizes to a steady state. In general, both a higher blood glucose level and a higher Vset results in a higher current (iSig).

Figure 13:
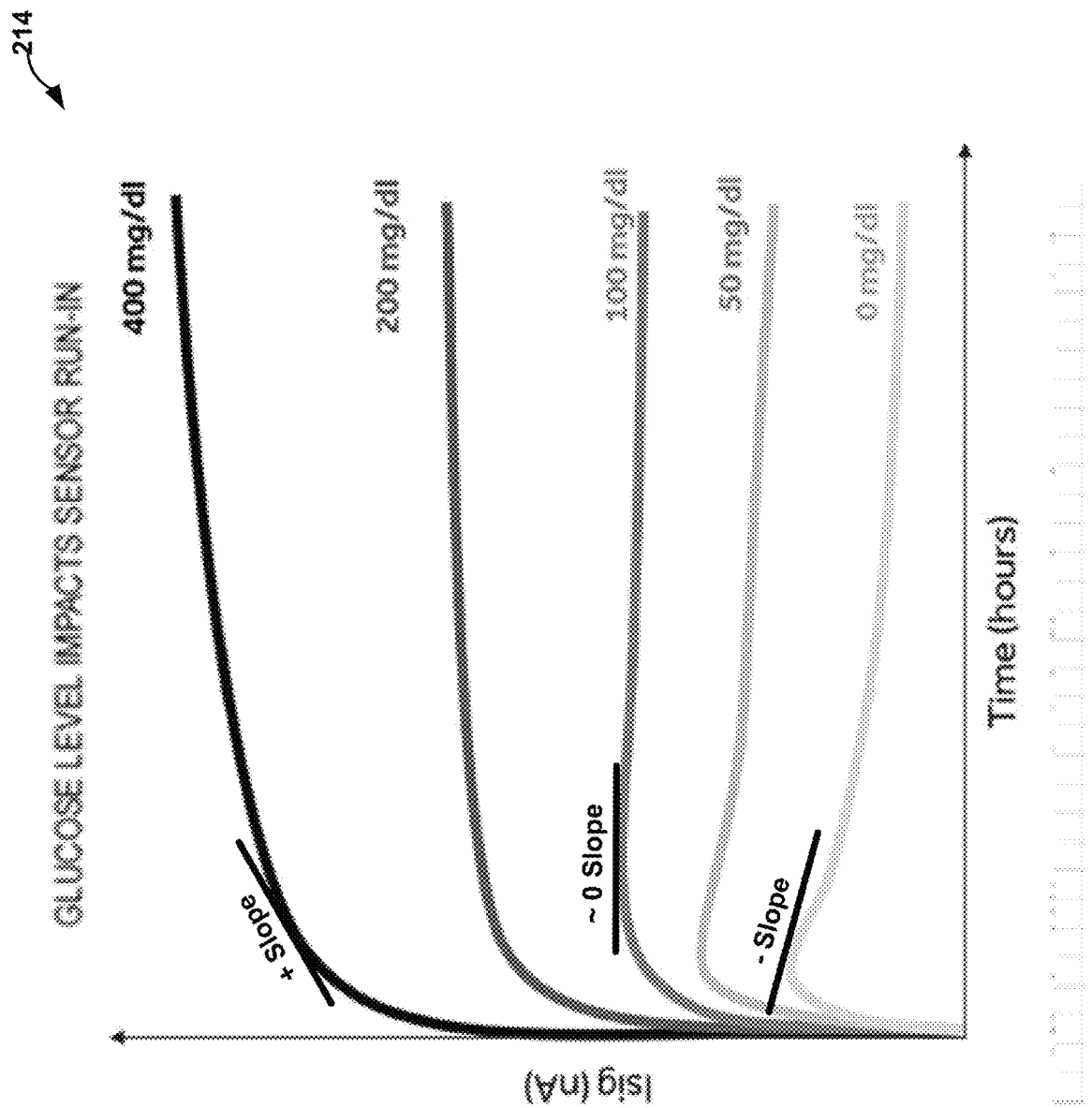
FIG. 13 is a conceptual diagram illustrating another example initialization sequence response for different glucose levels.

FIG. 13 is a conceptual diagram illustrating another example initialization sequence response for different glucose levels. Plot 214 of FIG. 13 shows that the slope of the current (iSig) at the working electrode of glucose sensor 20 varies with blood glucose level. In general, very high blood glucose levels (e.g., 400 mg/dl) and very low blood glucose levels (e.g., 0 mg/dl) result in high slopes (e.g., high rates of change) of the current (iSig) during the initialization sequence. Such slopes may cause controller 136 to raise the Vset of the initialization sequence. Conversely, a mid-level blood glucose level (e.g., 100 mg/dl) may result in a relatively low slope value for iSig. Such a low slope value may cause controller 136 to either maintain a Vset level in the initialization sequence or lower the Vset level in the initialization sequence.

Figure 14:
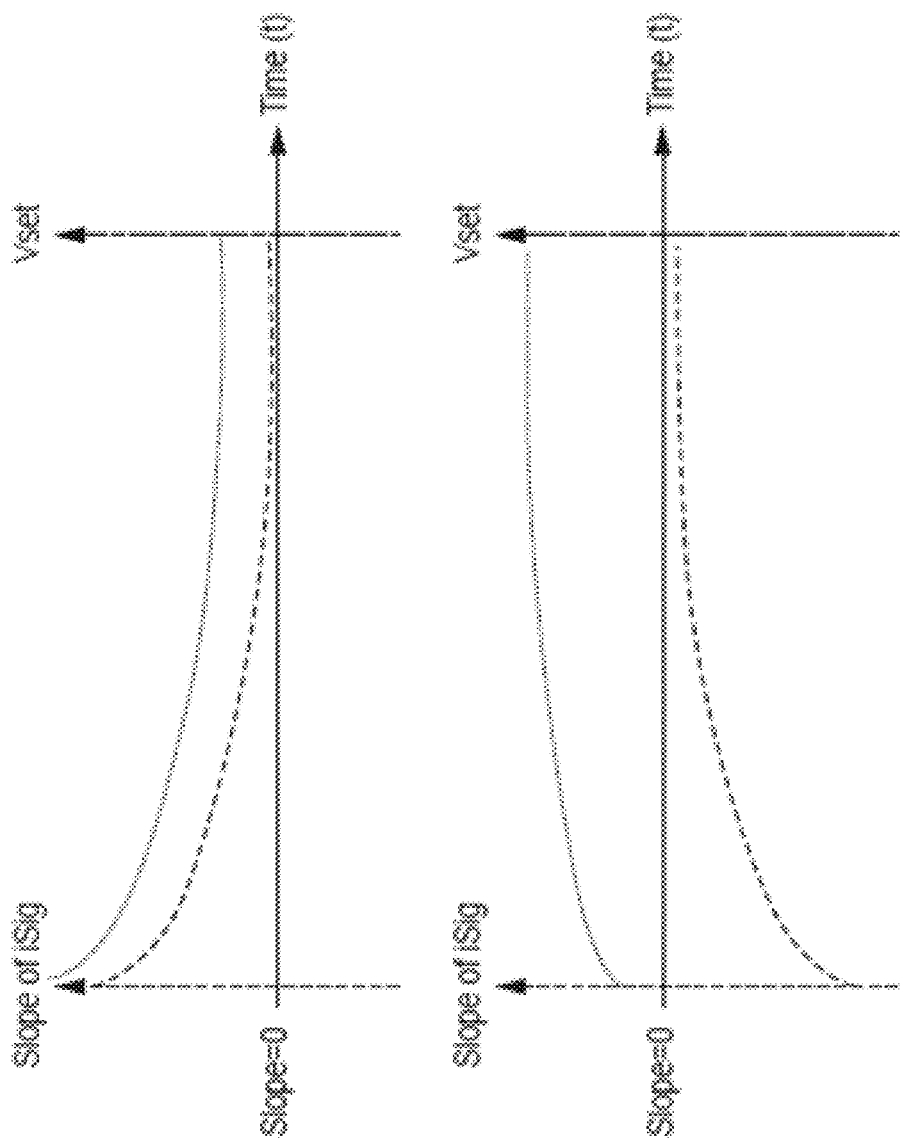
FIG. 14 is a conceptual diagram illustrating a change in voltage of an initialization sequence based on a slope of a current.

FIG. 14 is a conceptual diagram illustrating a change in voltage of an initialization sequence based on a slope of a current. As can be seen in plot 216, controller 136 may be configured to dynamically change the Vset values as the absolute value of the slope of the iSig changes. Lower values of the slope of iSig correlate to lower Vset levels, while higher values of the slope of iSig correlate to higher Vset levels.

Figure 15:
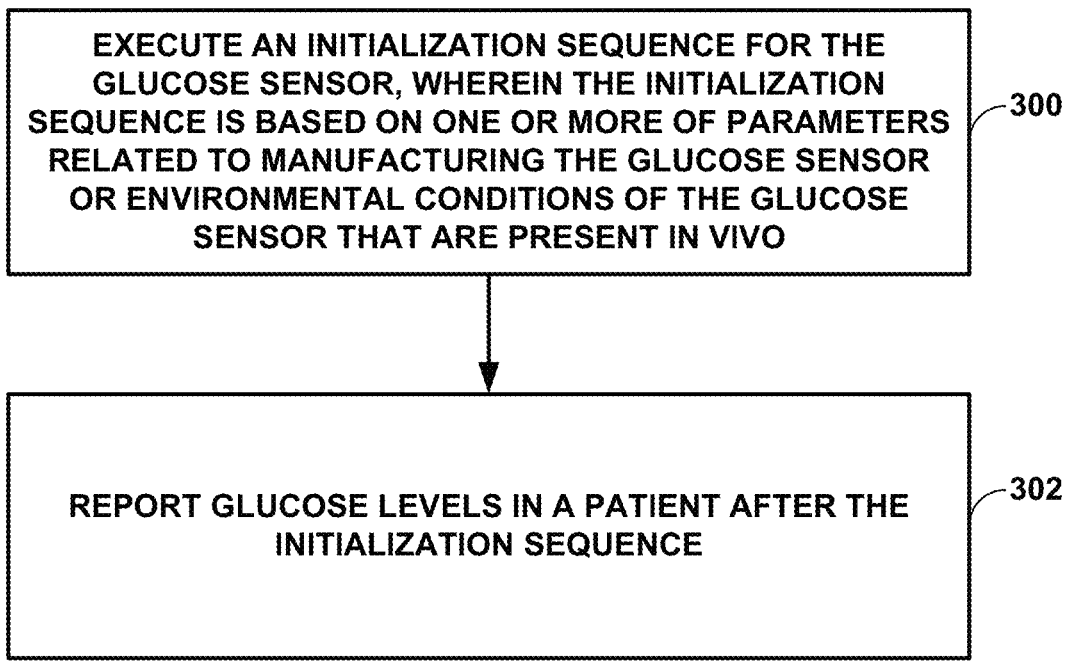
FIG. 15 is a flowchart illustrating an example technique of the disclosure.

FIG. 15 is a flowchart illustrating an example technique of the disclosure. The techniques of FIG. 15 may be performed by one or more processors of monitoring device 100 of FIG. 1 and FIG. 2, including controller 136. In one example of the disclosure, controller 136 may be configured to execute an initialization sequence for a glucose sensor (e.g., monitoring device 100), wherein the initialization sequence is based on one or more of parameters related to manufacturing the glucose sensor or environmental conditions of the glucose sensor that are present in vivo (300). Controller 136 may then cause monitoring device 100 to report glucose levels in a patient after the initialization sequence (302).

In one example, one or more of a duration, a voltage, or a duty cycle of the initialization sequence is based on the one or more parameters related to manufacturing glucose sensor 20 (see FIG. 2). In one example, the one or more parameters related to manufacturing the glucose sensor include one or more of a platinum surface area ratio, a glucose oxidase activity, a glucose oxidase thickness, an amount of an intermediate layer between an enzyme layer and a glucose limiting membrane, a glucose limiting membrane thickness, or a glucose limiting membrane permeability.

As discussed above, when executing an initialization sequence based on environmental conditions of the glucose sensor that are present in vivo, controller 136 may accumulate and measure one or more sensor signals (e.g., iSig) to determine a slope and/or rate of change. Controller 136 may then adjust the voltage (e.g., Vset) level of the sensor signal based on calculated slope.

Figure 16:
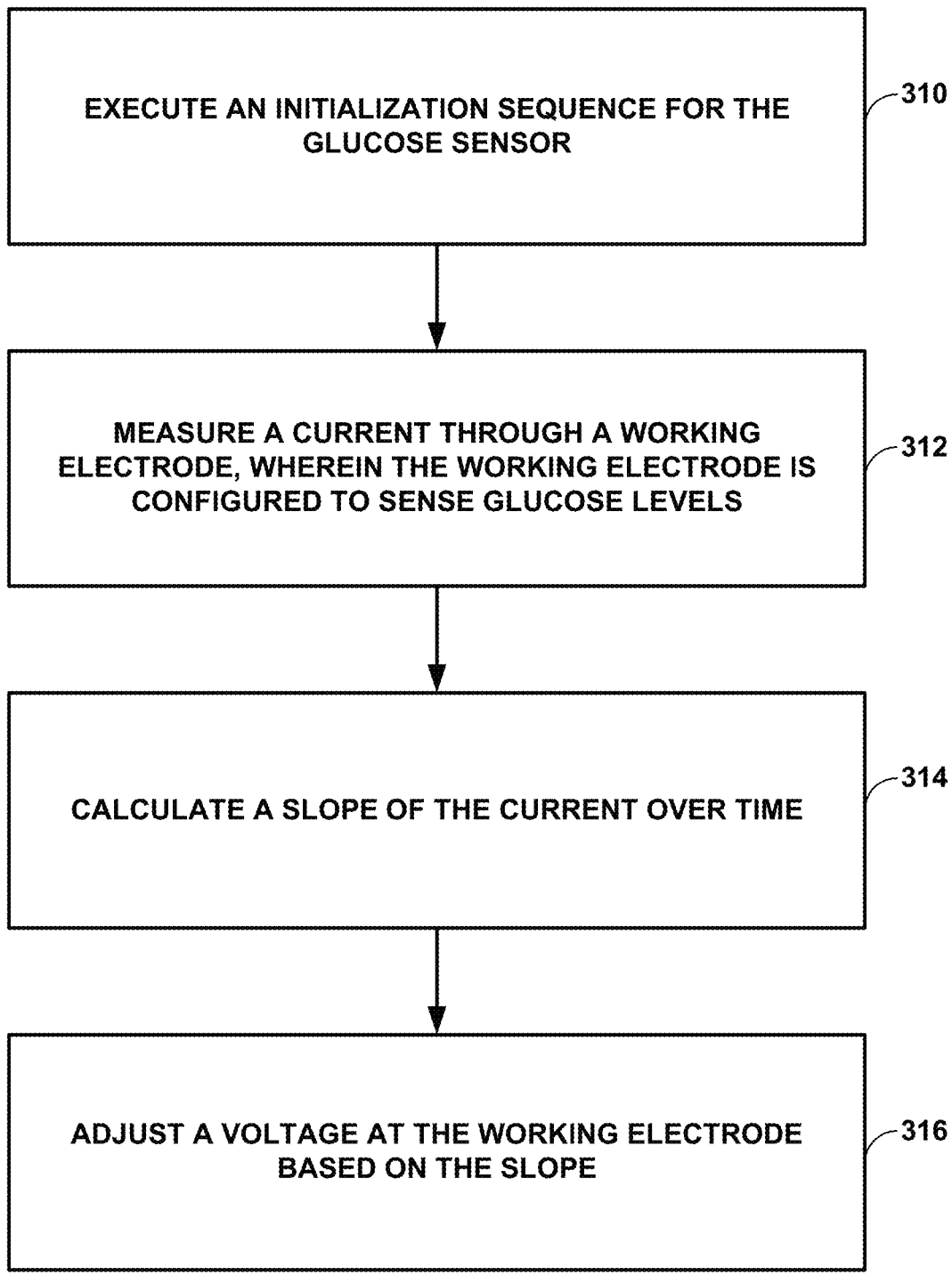
FIG. 16 is a flowchart illustrating another example technique of the disclosure.

FIG. 16 is a flowchart illustrating another example technique of the disclosure. In the example of FIG. 16, controller 136 may be configured to execute an initialization sequence for a glucose sensor (310). In this example, the initialization sequence is based on environmental conditions of the glucose sensor that are present in vivo. Controller 136 may be further configured to measure a current through a working electrode, wherein the working electrode is configured to sense glucose levels (312). Controller 136 may calculate a slope of the current over time (314), and adjust a voltage at the working electrode based on the slope (316).

In one example, to adjust the voltage at the electrode based on the slope, controller 136 is configured to raise the voltage at the electrode in the case the slope is higher than a first threshold, and lower the voltage at the electrode in the case the slope is lower than a second threshold. In another example, to calculate the slope of the current over time, controller 136 is configured to calculate a moving average of the slope of the current over a window of time.

In another example, controller 136 is configured to measure one or more of an electro chemical impedance spectroscopy of a working electrode, a voltage at a counter electrode, or a current through a background electrode. Controller 136 may further calculate a change of one or more of the electro chemical impedance spectroscopy of the working electrode, the voltage at the counter electrode, or the current through a background electrode over time, and adjust a voltage at the electrode based on the change of one or more of the electro chemical impedance spectroscopy of the working electrode, the voltage at the counter electrode, or the current through a background electrode over time.

Figure 17:
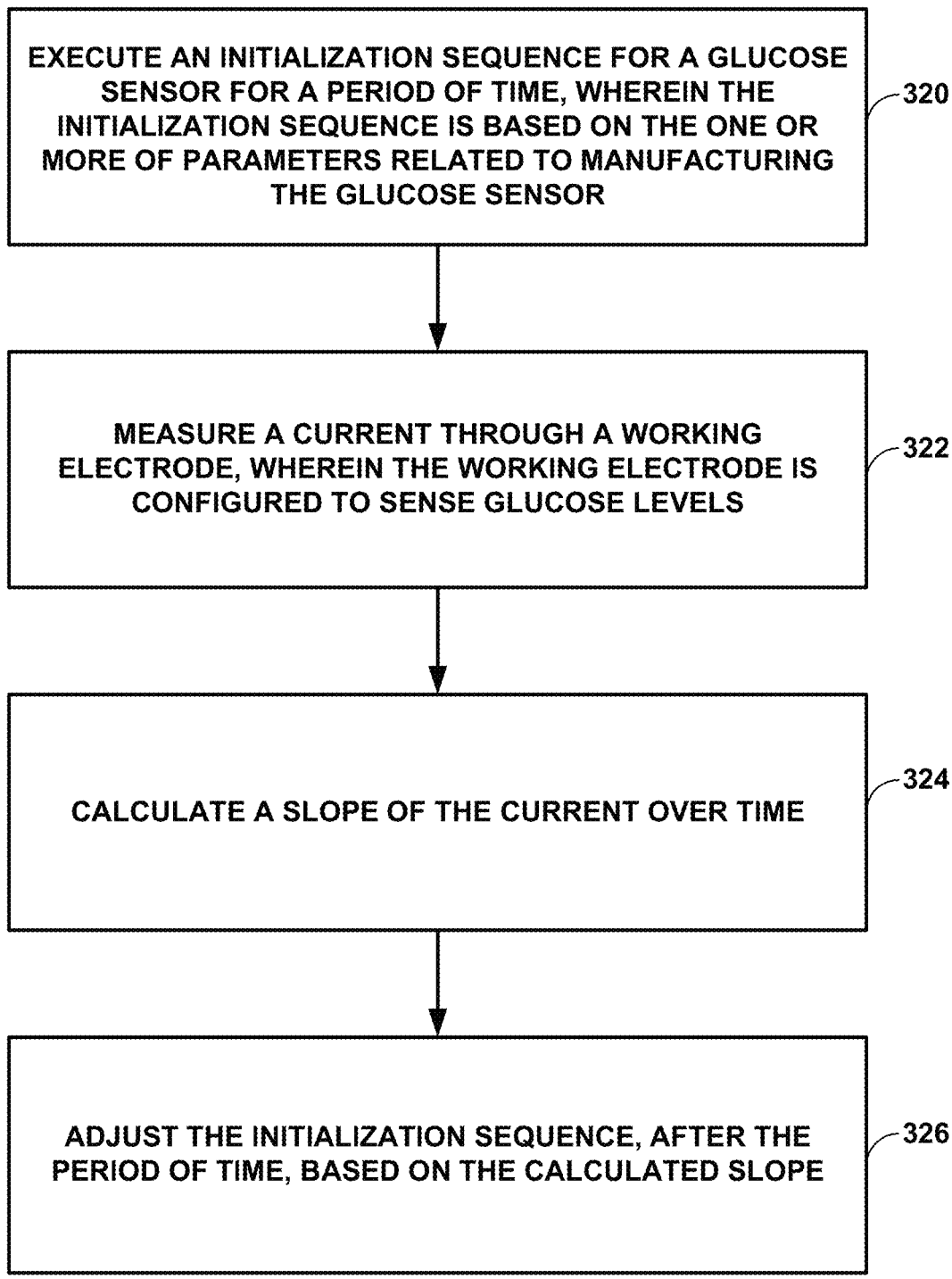
FIG. 17 is a flowchart illustrating another example technique of the disclosure.

FIG. 17 is a flowchart illustrating another example technique of the disclosure. In the example of FIG. 17, controller 136 is configured to execute an initialization sequence for a glucose sensor for a period of time, wherein the initialization sequence is based on the one or more of parameters related to manufacturing the glucose sensor (320). Controller 136 may further measure a current through a working electrode, wherein the working electrode is configured to sense glucose levels (322). Controller 136 may further calculate a slope of the current over time (324), and adjust the initialization sequence, after the period of time, based on the environmental conditions of the glucose sensor that are present in vivo (e.g., based on the calculated slope) (326).

Other illustrative examples of the disclosure are described below.

Example 1—A method for initializing a glucose sensor, the method comprising: executing an initialization sequence for the glucose sensor, wherein the initialization sequence is based on one or more of parameters related to manufacturing the glucose sensor or environmental conditions of the glucose sensor that are present in vivo; and reporting glucose levels in a patient after the initialization sequence.

Example 2—The method of Example 1, wherein one or more of a duration, a voltage, or a duty cycle of the initialization sequence is based on the one or more parameters related to manufacturing the glucose sensor.

Example 3—The method of any of Examples 1 and 2, wherein the one or more parameters related to manufacturing the glucose sensor include one or more of a platinum surface area ratio, a glucose oxidase activity, a glucose oxidase thickness, an amount of an intermediate layer between an enzyme layer and a glucose limiting membrane, a glucose limiting membrane thickness, or a glucose limiting membrane permeability.

Example 4—The method of Example 3, wherein the initialization sequence is based on the one or more of parameters related to manufacturing the glucose sensor, the method further comprising: determining initialization sequence for the glucose sensor based on one or more of the platinum surface area ratio, the glucose oxidase activity, the glucose oxidase thickness, the amount of the intermediate layer between the enzyme layer and the glucose limiting membrane, the glucose limiting membrane thickness, or the glucose limiting membrane permeability.

Example 5—The method of Example 1, wherein the initialization sequence is based on environmental conditions of the glucose sensor that are present in vivo, the method further comprising: measuring a current through an electrode; calculating a slope of the current over time; and adjusting a voltage at the electrode based on the slope.

Example 6—The method of Example 5, wherein the electrode is a working electrode configured to sense glucose levels.

Example 7—The method of any of Examples 5-6, wherein adjusting the voltage at the electrode based on the slope comprises: raising the voltage at the electrode in the case the slope is higher than a threshold.

Example 8—The method of any of Examples 5-6, wherein adjusting the voltage at the electrode based on the slope comprises: lowering the voltage at the electrode in the case the slope is lower than a threshold.

Example 9—The method of any of Examples 5-8, wherein calculating the slope of the current over time comprises: calculating the slope of the current once a minute.

Example 10—The method of any of Examples 5-9, wherein calculating the slope of the current over time comprises: calculating a moving average of the slope of the current over a window of time.

Example 11—The method of any of Examples 5-10, wherein measuring the current through the electrode comprises: initiating the measuring of the current through the electrode after a predetermined time post insertion of the glucose sensor into the patient.

Example 12—The method of Example 1, wherein the initialization sequence is based on environmental conditions of the glucose sensor that are present in vivo, the method further comprising: measuring an electro chemical impedance spectroscopy of an electrode; calculating a change of the electro chemical impedance spectroscopy over time; and adjusting a voltage at the electrode based on the change of the electro chemical impedance spectroscopy.

Example 13—The method of Example 1, wherein the initialization sequence is based on environmental conditions of the glucose sensor that are present in vivo, the method further comprising: measuring a voltage at a counter electrode; calculating a change of the voltage at the counter electrode over time; and adjusting a working voltage at a working electrode based on the change of the voltage at the counter electrode.

Example 14—The method of Example 1, wherein the initialization sequence is based on environmental conditions of the glucose sensor that are present in vivo, the method further comprising: measuring a current through a background electrode; calculating a slope of the current over time; and adjusting a voltage at a working electrode based on the slope.

Example 15—The method of Example 1, further comprising: determining the initialization sequence from a plurality of initialization sequences based on the environmental conditions of the glucose sensor that are present in vivo.

Example 16—The method of Example 15, further comprising: determining the plurality of initialization sequences based on the one or more of parameters related to manufacturing the glucose sensor.

Example 17—The method of Example 15, wherein the plurality of initialization sequences vary in terms of voltage curves, starting points of the voltage curves, ending points of the voltage curves, or durations of the voltage curves.

Example 18—The method of Example 1, wherein executing the initialization sequence for the glucose sensor comprises: executing the initialization sequence for the glucose sensor for a period of time, wherein the initialization sequence is based on the one or more of parameters related to manufacturing the glucose sensor; and adjusting the initialization sequence, after the period of time, based on the environmental conditions of the glucose sensor that are present in vivo.

Example 19—The method of Example 1, wherein the glucose sensor is an in vivo glucose sensor.

Example 20—The method of Example 1, wherein the glucose sensor is part of a continuous glucose monitor.

Example 21—An device comprising a memory and one or more processors configured to perform any of the methods of Examples 1-20.

Example 22—A non-transitory computer-readable storage medium storing instructions that, when executed, cause one or more processors to perform any of the methods of Examples 1-20.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method for initializing a glucose sensor, the method comprising:
    determining a current profile for current flowing through a working electrode of the glucose sensor based on one or more parameters related to manufacturing of the glucose sensor or environmental conditions of the glucose sensor that are present in vivo, wherein the current profile comprises a slope of the current over time;
    determining one or more parameters of a sequence of voltage pulses of an initialization sequence based on the current profile, wherein the one or more parameters comprise a voltage amplitude of the sequence of voltage pulses based at least in part on the slope of the current;
    executing the initialization sequence by applying the sequence of voltage pulses to the working electrode of the glucose sensor at least partially inserted subcutaneously in a patient; and
    reporting glucose levels in a patient after the initialization sequence.

2. The method of claim 1, wherein a duration or a duty cycle of the voltage pulses in the sequence of voltage pulses is based on the one or more parameters related to manufacturing the glucose sensor, and
    wherein the one or more parameters related to manufacturing the glucose sensor include one or more of a platinum surface area ratio, a glucose oxidase activity, a glucose oxidase thickness, an amount of an intermediate layer between an enzyme layer and a glucose limiting membrane, a glucose limiting membrane thickness, or a glucose limiting membrane permeability.

3. The method of claim 1, wherein the initialization sequence is based on the environmental conditions of the glucose sensor that are present in vivo, the method further comprising:
    measuring the current through the working electrode, wherein the working electrode is configured to sense glucose levels;
    calculating the slope of the current over time; and
    adjusting a voltage at the working electrode based on the slope.

4. The method of claim 3, wherein adjusting the voltage at the electrode based on the slope comprises:
    raising the voltage at the electrode in the case the slope is higher than a first threshold; and
    lowering the voltage at the electrode in the case the slope is lower than a second threshold.

5. The method of claim 3, wherein calculating the slope of the current over time comprises:
calculating a moving average of the slope of the current over a window of time.

6. The method of claim 1, wherein the initialization sequence is based on environmental conditions of the glucose sensor that are present in vivo, the method further comprising:
measuring one or more of an electro chemical impedance spectroscopy of a working electrode, a voltage at a counter electrode, or a current through a background electrode;
calculating a change of one or more of the electro chemical impedance spectroscopy of the working electrode, the voltage at the counter electrode, or the current through a background electrode over time; and
adjusting a voltage at the working electrode based on the change of one or more of the electro chemical impedance spectroscopy of the working electrode, the voltage at the counter electrode, or the current through a background electrode over time.

7. The method of claim 1, further comprising:
determining the initialization sequence from a plurality of initialization sequences based on the environmental conditions of the glucose sensor that are present in vivo.

8. The method of claim 7, wherein the plurality of initialization sequences vary in terms of voltage curves, starting points of the voltage curves, ending points of the voltage curves, or durations of the voltage curves.

9. The method of claim 1, wherein executing the initialization sequence for the glucose sensor comprises:
executing the initialization sequence for the glucose sensor for a period of time, wherein the initialization sequence is based on the one or more of parameters related to manufacturing the glucose sensor; and
adjusting the initialization sequence, after the period of time, based on the environmental conditions of the glucose sensor that are present in vivo.

10. A device for initializing a glucose sensor, the device comprising:
a memory; and
one or more processors implemented in circuitry and in communication with the memory, the one or more processors configured to:
determine a current profile for current flowing through a working electrode of the glucose sensor based on one or more parameters related to manufacturing of the glucose sensor or environmental conditions of the glucose sensor that are present in vivo, wherein the current profile comprises a slope of the current over time;
determine one or more parameters of a sequence of voltage pulses of an initialization sequence based on the current profile, wherein the one or more parameters comprise a voltage amplitude of the sequence of voltage pulses based at least in part on the slope of the current;
execute the initialization sequence by applying the sequence of voltage pulses to the working electrode of the glucose sensor at least partially inserted subcutaneously in a patient; and
report glucose levels in a patient after the initialization sequence.

11. The device of claim 10, wherein the duration, the voltage, or the duty cycle of the initialization sequence is based on the one or more parameters related to manufacturing the glucose sensor, and
wherein the one or more parameters related to manufacturing the glucose sensor include one or more of a platinum surface area ratio, a glucose oxidase activity, a glucose oxidase thickness, an amount of an intermediate layer between an enzyme layer and a glucose limiting membrane, a glucose limiting membrane thickness, or a glucose limiting membrane permeability.

12. The device of claim 10, wherein the initialization sequence is based on the environmental conditions of the glucose sensor that are present in vivo, and wherein the one or more processors are further configured to:
measure the current through the working electrode, wherein the working electrode is configured to sense glucose levels;
calculate the slope of the current over time; and
adjust a voltage at the working electrode based on the slope.

13. The device of claim 12, wherein to adjust the voltage at the electrode based on the slope, the one or more processors are further configured to:
raise the voltage at the electrode in the case the slope is higher than a first threshold; and
lower the voltage at the electrode in the case the slope is lower than a second threshold.

14. The device of claim 12, wherein to calculate the slope of the current over time, the one or more processors are further configured to:
calculate a moving average of the slope of the current over a window of time.

15. The device of claim 10, wherein the initialization sequence is based on environmental conditions of the glucose sensor that are present in vivo, and wherein the one or more processors are further configured to:
measure one or more of an electro chemical impedance spectroscopy of a working electrode, a voltage at a counter electrode, or a current through a background electrode;
calculate a change of one or more of the electro chemical impedance spectroscopy of the working electrode, the voltage at the counter electrode, or the current through a background electrode over time; and
adjust a voltage at the working electrode based on the change of one or more of the electro chemical impedance spectroscopy of the working electrode, the voltage at the counter electrode, or the current through a background electrode over time.

16. The device of claim 10, wherein the one or more processors are further configured to:
determine the initialization sequence from a plurality of initialization sequences based on the environmental conditions of the glucose sensor that are present in vivo.

17. The device of claim 16, wherein the plurality of initialization sequences vary in terms of voltage curves, starting points of the voltage curves, ending points of the voltage curves, or durations of the voltage curves.

18. The device of claim 10, wherein to execute the initialization sequence for the glucose sensor, the one or more processors are further configured to:
execute the initialization sequence for the glucose sensor for a period of time, wherein the initialization sequence is based on the one or more of parameters related to manufacturing the glucose sensor; and adjust the initialization sequence, after the period of time, based on the environmental conditions of the glucose sensor that are present in vivo.

19. The device of claim 10, wherein the device is a continuous glucose monitor that includes the glucose sensor.

20. A non-transitory computer-readable storage medium having stored thereon instructions that, when executed, configure a processor to:
  determine a current profile for current flowing through a working electrode of a glucose sensor based on one or more parameters related to manufacturing of the glucose sensor or environmental conditions of the glucose sensor that are present in vivo, wherein the current profile comprises a measured change in the current over time;
  determine one or more parameters of a sequence of voltage pulses of an initialization sequence based on the current profile, wherein the one or more parameters comprise a voltage amplitude of the sequence of voltage pulses based on the measured change in the current;
  execute the initialization sequence by applying the sequence of voltage pulses to the working electrode of the glucose sensor at least partially inserted subcutaneously in a patient; and
  report glucose levels in a patient after the initialization sequence.

* * * * *